(12) United States Patent
Lindner et al.

(10) Patent No.: US 12,061,809 B2
(45) Date of Patent: Aug. 13, 2024

(54) EFFICIENT PATH STATE REPORTING FOR UNIFORM HOST ATTACHMENT CONFIGURATION

(71) Applicant: Dell Products L.P., Hopkinton, MA (US)

(72) Inventors: Dave J. Lindner, Nashua, NH (US); Mrinalini Chavan, Westford, MA (US)

(73) Assignee: Dell Products L.P., Hopkinton, MA (US)

( * ) Notice: Subject to any disclaimer, the term of this patent is extended or adjusted under 35 U.S.C. 154(b) by 135 days.

(21) Appl. No.: 17/949,807

(22) Filed: Sep. 21, 2022

(65) Prior Publication Data
US 2024/0094931 A1 Mar. 21, 2024

(51) Int. Cl.
*G06F 3/06* (2006.01)

(52) U.S. Cl.
CPC .......... *G06F 3/0635* (2013.01); *G06F 3/0613* (2013.01); *G06F 3/0632* (2013.01); *G06F 3/067* (2013.01)

(58) Field of Classification Search
CPC .... G06F 3/0604; G06F 3/0607; G06F 3/0613; G06F 3/0614; G06F 3/0617; G06F 3/0629; G06F 3/0632; G06F 3/0635; G06F 3/065; G06F 3/067; G06F 3/0683; G06F 3/0689
USPC ............. 710/38, 74; 711/154; 714/6.23, 6.3
See application file for complete search history.

(56) References Cited

U.S. PATENT DOCUMENTS

| | | | |
|---|---|---|---|
| 11,392,329 B1* | 7/2022 | Tylik | G06F 3/0683 |
| 2017/0038995 A1* | 2/2017 | Suetsugu | G06F 3/0683 |
| 2020/0183798 A1* | 6/2020 | Riedy | G06F 11/2076 |
| 2022/0129152 A1* | 4/2022 | Adams | G06F 3/0655 |

* cited by examiner

*Primary Examiner* — Ilwoo Park
(74) *Attorney, Agent, or Firm* — Muirhead and Saturnelli, LLC

(57) ABSTRACT

Host access to a system DS1 can be configured for a logical device L1 so that L1 is exposed to the host over path P1 from DS1. Prior to configuring host access to L1 on another system DS2, configuration information of DS1 can be updated to include a fully populated uniform host configuration for the host with respect to L1. The fully populated uniform host configuration can identify P1 as well as path P2 between DS2 and the host. Even though P2 may not be established so that L1 is not yet exposed to the host over P2, DS1 can use the information included in the fully populated uniform host configuration to report information to the host regarding path state information for P1 and P2. The host can directly query DS2 regarding P2 in order to determine current up-to-date information regarding the path state of P2 with respect to L1.

20 Claims, 17 Drawing Sheets

| | | Reported information 805c | |
|---|---|---|---|
| Requesting Host 805a | TPG receiving RTPG command 805b | | |
| Host 1 (412) | TPG 1A (401a) | TPG1A(401a)=AO | TPG 1B(401b)=ANO | TPG2A(401c)=AO | TPG 2B(401d)=ANO |
| Host 1 (412) | TPG 1B (401b) | TPG1A(401a)=AO | TPG 1B(401b)=ANO | TPG2A(401c)=AO | TPG 2B(401d)=ANO |
| Host 1 (412) | TPG 2A (401c) | TPG1A(401a)=AO | TPG 1B(401b)=ANO | TPG2A(401c)=AO | TPG 2B(401d)=ANO |
| Host 1 (412) | TPG 2B (401d) | TPG1A(401a)=AO | TPG 1B(401b)=ANO | TPG2A(401c)=AO | TPG 2B(401d)=ANO |

| | | Reported information 815c | |
|---|---|---|---|
| Requesting Host 815a | TPG receiving RTPG command 815b | | |
| Host 2 (432) | TPG 1A (401a) | TPG1A(401a)=AO | TPG 1B(401b)=ANO | TPG2A(401c)=AO | TPG 2B(401d)=ANO |
| Host 2 (432) | TPG 1B (401b) | TPG1A(401a)=AO | TPG 1B(401b)=ANO | TPG2A(401c)=AO | TPG 2B(401d)=ANO |
| Host 2 (432) | TPG 2A (401c) | TPG1A(401a)=AO | TPG 1B(401b)=ANO | TPG2A(401c)=AO | TPG 2B(401d)=ANO |
| Host 2 (432) | TPG 2B (401d) | TPG1A(401a)=AO | TPG 1B(401b)=ANO | TPG2A(401c)=AO | TPG 2B(401d)=ANO |

Processing can be performed at a first point in time PT1 to configure and establish connectivity for the host 412 to access the stretched "LUN A" on DS 410. A first volume or LUN, V1 425a, on DS 410 can be configured to have the identity of "LUN A" as presented or exposed to the host 412 over one or more paths from DS 410. The one or more paths can generally be between one or more initiators of the host 412 and one or more target ports or TPGs 410a-b of the DS 410.

Configuration information, such as may be stored in the Mgt DB A 411a, of DS 410 can be updated to include the fully populated uniform host connectivity information for the host 412. At this point in time PT1, the fully populated uniform host connectivity can be characterized as preconfigured or predetermined in that it may not reflect the current, actual or up to date established host connectivity with respect to the stretched LUN A, the host 412, DS 410 and DS 430. In at least one embodiment at the time PT1, only host 412-DS 410 connectivity can be established so that the stretched LUN A is only exposed of one or more paths of the DS 410, and so that the stretched LUN A is not yet exposed over any path of the DS 430. In at least one embodiment, the configuration information of the DS 410 can be updated to include the ALUA path state information as illustrated in the table 601 of Figure 9A for use in reporting ALUA path state information regarding the stretched LUN A, for example, in response to a RTPG command received at a target port of DS 410 or DS 430.

904

At a second point in time PT2 which is subsequent to PT1, an initiator Ix of the host 412 can send a first RTPG command to a target port Tx of DS 410 requesting information regarding the stretched LUN A, which is configured from V1 425a on DS 410. At the second point in time PT2, the configuration can be in the state S1a where the host 412-DS 410 connectivity is established so that V1 425a configured as LUN A is exposed to the host 412 over one or more paths from DS 410, but where the host 412-DS430 connectivity is not yet established so that LUN A is not exposed to the host 412 over any path from DS 430.

In response to the first RTPG command received at the target port Tx of DS 410, Tx can send a first response R1 to Ix of the host 412 with information regarding the LUN A. Tx of DS 410 can use the configuration information as stored in the Mgt DB A 411a of DS 410 to include in the first response to the first RTPG command returned to Ix of the host 412. In particular, Tx of DS 410 can report information from the fully populated uniform host connectivity information for the host 412 in the first response R1 to the first RTPG command. With reference to the table 601 of Figure 9A, Tx of DS 410 is included in either TPG 401a or 401b and can thus report ALUA path state information as denoted by the column 601e of the corresponding row 602a or 602b.

FIG. 12A

950

906

At a third point in time PT3 which is subsequent to PT2, the initiator Ix of the host 412 can send a second RTPG command to a target port Ty of DS 432 requesting information regarding the stretched LUN A. At the time PT3, the configuration can still be in the state S1a where the host 412-DS 410 connectivity is established so that V1 425a configured as LUN A is exposed to the host 412 over one or paths from DS 410, but where the host 412-DS430 connectivity is not yet established so that LUN A is not exposed to the host 412 over any path from DS 430.

In response to the second RTPG command received at the target port Ty of DS 430, Ty can send a second response R2 to Ix of the host 412 indicating that there is no path and thus no path information regarding the LUN A since the LUN A is currently not exposed to the host 412 over any path from DS 430. At the time PT3, Ty of DS 430 is either included in TPG 401c of 401d so that the indication of no path and no path information regarding LUN A corresponds to the reported information 601c as denoted by the rows 602c-d of the table 601.

908

The host 412 can detect the inconsistency between the ALUA path state information for the LUN A as reported in the first response R1 and the second response R2. ALUA path state information regarding Ty as reported by Ty can be considered as the current, up to date information regarding Ty since Ty is the authoritative target port for reporting information about Ty. In other words, ALUA path state information which Ty reports about itself can be considered as the current or correct information about Ty. In this case, the host 412 can resolve the inconsistency regarding the ALUA path state of Ty by using the current information about Ty as reported in R2 from Ty. The host 412 can use the current path state information regarding the LUN A for any suitable purpose. For example, the host 412 can use the current path state information regarding LUN A to select a path over which to send an I/O directed to the LUN A. In at least one embodiment, the host 412 can send the I/O over an AO path to the LUN A. In some embodiments, there can be multiple AO paths to the LUN A where the host 412 can use any suitable technique to select one of the multiple AO paths over which to send the I/O to the LUN A. In at least one embodiment, the MP driver of the host 412 can perform such path selection for sending the I/O to the LUN A.

910

At a fourth point in time PT4 which is subsequent to PT3, processing can be performed to configure and establish connectivity for the host 412 to access the stretched "LUN A" on DS 430. A second volume or LUN, V2 425b, on DS 430 can be configured to have the identity of "LUN A" as presented or exposed to the host 412 over one or more paths from DS 430. The one or more paths can generally be between one or more initiators of the host 412 and one or more target ports or TPGs 410c-d of the DS 430.

At a fifth point in time PT5 which is subsequent to PT4, the initiator Ix of the host 412 can send a third RTPG command to a target port T of either the DS 410 or the DS 430 requesting information regarding the stretched LUN A, which is configured as V1 425a on DS 410 and V2 425b on DS 430. At PT5, the configuration can be in the state S2 where the host 412-DS 410 connectivity is established so that V1 425a configured as LUN A is exposed to the host 412 over one or paths from DS 410, and also where the host 412-DS430 connectivity is established so that LUN A is exposed to the host 412 over paths from both DS 410 and also from DS 430.

In response to the third RTPG command received at the target port T of DS 410, T can send a response to Ix of the host 412 with information regarding the LUN A. If T is in DS 410, T can use the configuration information as stored the either Mgt DB A 411a of DS 410 to include in the response. If T is in DS 430, T can use the configuration information as stored the Mgt DB B 411b of DS 410 to include in the response. In particular, T can include information from the fully populated uniform host connectivity information for the host 412 in the response to the RTPG command. With reference to the table 605 of Figure 9A, T is included in one of the TPGs 401a-d and can thus report ALUA path state information as denoted by the column 601c of the corresponding one of the rows 606a-d denoting the same fully populated uniform host connectivity information regarding LUN A for the host 412.

FIG 12C

EFFICIENT PATH STATE REPORTING FOR UNIFORM HOST ATTACHMENT CONFIGURATION

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O (input/output) operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a method, a system and a computer readable medium. Connectivity can be established for a host to access a logical device L1 over a first path P1 between the host and a first data storage system DS1, wherein a first volume V1 on DS1 is configured as L1, and wherein V1 is exposed to the host as L1 over P1 between the host and DS1. First configuration information of DS1 can be updated to include a fully populated uniform host connectivity information for the host, wherein the fully populated uniform host connectivity information includes first path state information and second path state information, wherein the first path state information includes path state information regarding P1 between the host and DS1 over which L1 is exposed to the host, and wherein the second path state information includes path state information regarding a second path P2 between the host and a second data storage system DS2 over which L1 is exposed to the host, and wherein at a first point in time, T1 is established, P2 is not yet established, L1 is exposed over P1 to the host, and L1 is not exposed over P2 to the host. At the first point in time T1 and prior to establishing connectivity for the host to access L1 over P2 between the host and DS2, first processing can be performed which includes reporting, by DS1 at the first point in time T1, first information regarding L1 to the host, wherein the first information includes a first path state S1 regarding P1 whereby S1 denotes P1 is established, and wherein the first information includes a second path state S2 regarding P2 whereby S2 denotes P2 is established, and wherein S1 and S2 are included in the fully populated uniform host connectivity information. Prior to establishing connectivity for the host to access L1 over P1, L1 may not be exposed to the host over any path between the host and DS1. Prior to establishing connectivity for the host to access L1 over P2, L1 may not be exposed to the host over any path between the host and DS2.

In at least one embodiment, processing can include: establishing connectivity for the host to access L1 over P2 between the host and DS2, wherein a second volume V2 on D2 is configured as L1 and wherein V2 is exposed to the host as L1 over P2 between the host and DS2; and updating second configuration information of DS2 to include the fully populated uniform host connectivity information for the host, and wherein at a second point in time T2 subsequent to T1, P1 is established, P2 is established, and L1 is exposed over both P1 and P2 to the host. V1 and V2 can be configured for bi-directional synchronous replication. Processing can include: receiving, at DS1 from the host over P1, first writes directed to L1 are received at DS1; and in response to said receiving the first writes, performing second processing including: applying the first writes to V1 configured as L1; replicating the first writes to DS2; and applying the first writes to V2 configured as L1. Processing can include: receiving, at DS2 from the host over P2, second writes directed to L1 are received at DS2; and in response to said receiving the second writes, performing third processing including: applying the second writes to V2 configured as L1; replicating the second writes to DS1; and applying the second writes to V1 configured as L1.

In at least one embodiment, the first processing can include receiving, at DS1, a first command from the host sent over P1, and wherein said reporting the first information is in response to said receiving the first command from the host over P1. P1 can denote a path between a first initiator of the host and a first target port of DS1, and wherein L1 is exposed over the first target port to the first initiator. Processing can include reporting second information from DS2 to the host, wherein the second information indicates that L1 is not exposed to the host over any path from DS2, and wherein P2 denotes a path between the first initiator of the host and a second target port of DS2, and wherein the second information is reported by the second target port to the host. The host can detect an inconsistency between the first information and the second information regarding P2 with respect to L1, wherein the inconsistency is that the first information indicates P2 is established whereby L1 is exposed over P2 having an associated state S2, and that the second information indicates that P2 is not established whereby L1 is not exposed over P2. The host can resolve the inconsistency by using the second information sent from the second target port of DS2. The second target port can be authoritative regarding path state information for paths including the second target port.

In at least one embodiment, the fully populated uniform host connectivity information for the host can indicate that the state S1 for P1 is active optimized (AO) for the host with respect to L1 thereby indicating that the host use P1 to send I/Os to L1, and wherein the fully populated uniform host connectivity information for the host can indicate that the state S2 for P2 is active non-optimized (ANO) for the host with respect to L1 thereby indicating that the host not use P2 to send I/Os to L1. The the host and DS1 can be in the same data center thereby indicating that DS1 is locally located with respect to the host, and wherein the host and DS2 may not be in the same data center thereby indicating that DS2 is remotely located with respect to the host.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 9A, 9B and 11 are examples of tables of information that can be reported in at least one embodiment in accordance with the techniques of the present disclosure.

FIGS. 12A, 12B and 12C are flowcharts of processing steps that can be performed in at least one embodiment in accordance with the techniques of the present disclosure.

DETAILED DESCRIPTION OF EMBODIMENT(S)

Figure 1:
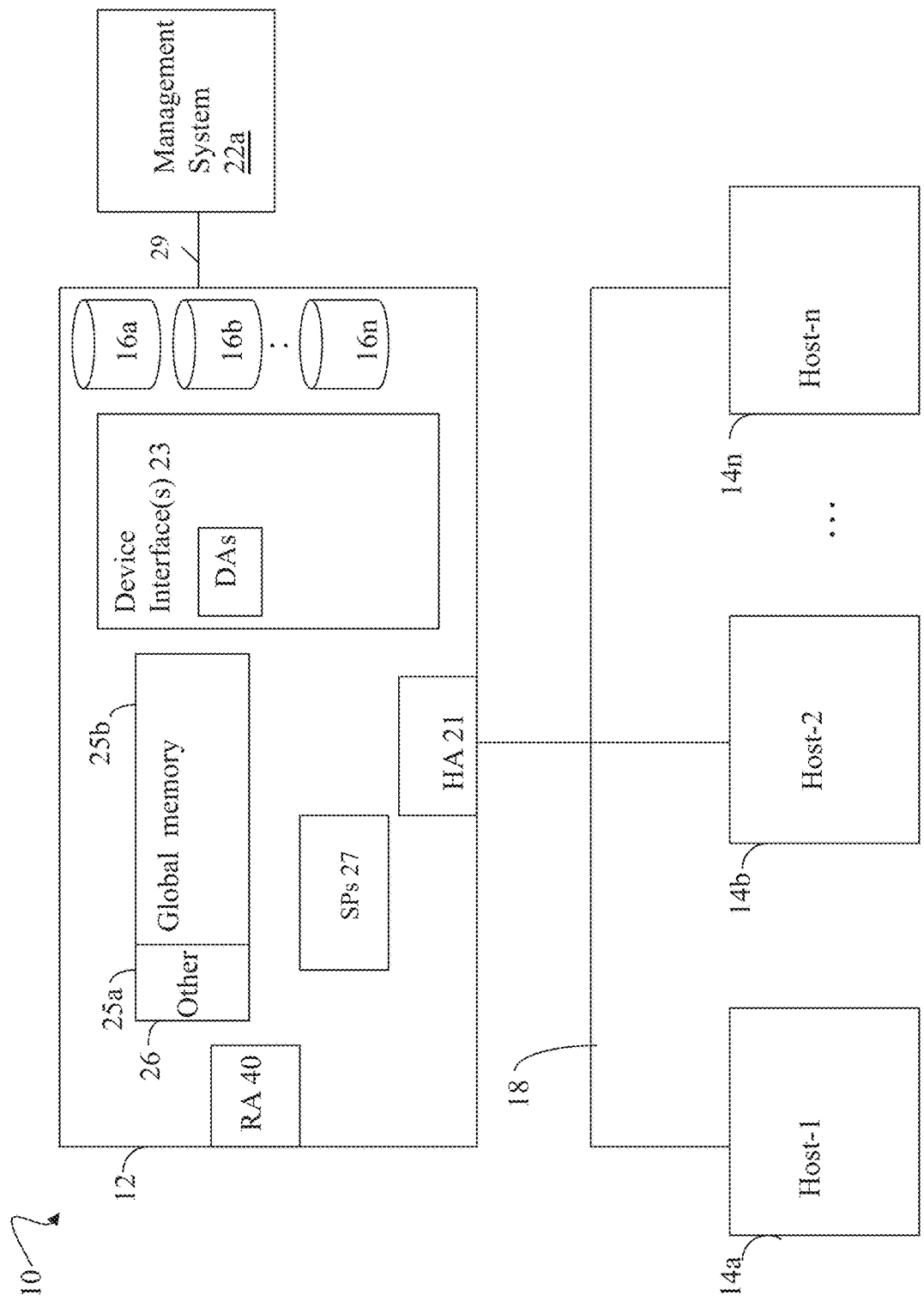
FIG. 1 is an example of components that can be included in a system in accordance with the techniques described herein.

A metro cluster configuration in at least one embodiment can be characterized as a configuration with two data storage systems each including a different volume Vi of a volume pair (V1, V2), where each volume of the pair is configured to have the same logical device identity when exposed to a host or other data storage client. Thus, the volume pair can be presented to the host or other client as a single logical device L, sometimes also referred to as a metro volume or device, or a stretched volume or device, accessible and exposed over multiple paths between both data storage systems and the host. Although descriptions below may reference a metro cluster configuration including two data storage systems, more generally, the embodiments of a metro cluster configuration can include more than two data storage system and more than a pair of volumes such that each of the storage systems includes one of the volumes configured to have the same logical device identity when exposed to the host or other data storage client.

In at least one metro cluster configuration including two data storage systems, each of the two data storage systems, DS1 and DS2, can be in a different data center. A host can be configured with uniform host connectivity or attachment in the metro cluster configuration. With uniform host attachment or connectivity, the host has connectivity to both data storage systems DS1 and DS2 of the metro cluster configuration. In particular with uniform host attachment or connectivity established with respect to a stretched volume or logical device L, the host can be configured to have connectivity to both the volumes V1 and V2, the identically configured volumes of the volume pair, respectively located in the two systems DS1, DS2. The host can be located in one of the data centers with DS1, where DS1 can be characterized as local with respect to the host, and where the remaining DS2 located in a different data center can be characterized as remote with respect to the host. The volumes V1 and V2 can be configured for synchronous bi-directional or two way remote replication in order to maintain V1 and V2 as data mirrors presented to the host as the single configured logical device L.

In the metro cluster configuration, the data storage systems can be SCSI-based systems operating in accordance with the SCSI standard. In the metro cluster configuration, the hosts and data storage systems can operate in accordance with ALUA (Asymmetrical Logical Unit Access), which is included in the SCSI standard. ALUA specifies a mechanism for asymmetric or symmetric access of a logical device, logical unit or LUN as used herein. ALUA allows the host and/or data storage system to set a LUN's access state or paths state with respect to a particular initiator port and the target port. Thus, in accordance with the ALUA standard, various access states (also sometimes referred to herein as ALUA states or path states) can be associated with a path with respect to a particular exposed device, such as a LUN. In particular, the ALUA standard defines such access states including active-optimized (AO), active-non optimized (ANO), as well as others. With respect to a stretched volume, device or LUN, L, first paths between the host to the local DS1 can be configured as AO, and second paths between the host and the remote DS2 can be configured as ANO, such that under normal operating conditions, the host uses the AO paths to the local DS1 for issuing I/Os directed to the stretched LUN L rather than the ANO paths to the remote DS2. The ANO paths can be used by the host under non-normal operating conditions such as when the local DS1 experiences a disaster, or more generally, when the host is unable to access the stretched LUN L over AO paths between the host and the local DS1.

With SCSI protocols, a host can use a command such as the REPORT TARGET PORT GROUP (RTPG) command as part of discovery processing. In particular, initiators of the host can query target ports by sending RTPG commands to all connected target system ports of both the local DS1 and the remote DS2 to discover information including ALUA path states with respect to the stretched LUN L exposed to the host over paths between the target system ports and the host initiators. The host can send a RTPG command requesting information regarding the stretched LUN L over a first path from initiator I1 of the host to the target port T1 of the local DS1. In response, T1 of DS1 can report information to I1 of the host regarding ALUA path state information not only for the path I1-T1 but also regarding other paths over which the stretched LUN L is exposed to the host. In this manner, the response from T1 can include ALUA path state information regarding the original first path over which the RTPG command is sent as well as a second path between I1 of the host and the target port T2 of the remote DS2. More generally, queried target ports of DS1 exposing V1 configured as the stretched LUN L can also report ALUA path state and other information regarding remote target ports of the remote DS2, where such other remote target ports of DS2 expose V2 configured as the stretched LUN L.

Supporting the RTPG command in connection with information reported for ALUA path states for stretched LUNs can require complex coordination and communication between DS1 and DS2 especially since configuring the host access to both data storage systems DS1 and DS2 can typically be performed in a step-wise manner. For example, in order for each of the data storage systems DS1, DS2 to report complete information regarding all target ports of DS1 and DS2 exposing the stretched LUN, both DS1 and DS2 can communicate with each other where, for example, DS1 can provide DS2 with its up to date ALUA path state information, and where DS2 can similarly provide DS1 with its up to date ALUA path state information.

A fully populated configuration with respect to uniform host connectivity or access for a stretched LUN in a metro cluster configuration can be characterized as a desired end result or target configuration. With the fully populated configuration, host access to the stretched LUN (e.g., volumes V1 and V2 configured with the same identity of the stretched LUN) can configured on both DS1 and DS2 over a network. However, the fully populated configuration is not completed or established instantaneously and can typically be completed or established in multiple steps over a time period. For example, host access can be configured individually on both DS1 and DS2. In this case for example, a user can perform a first part of the configuration to configure and establish host access to V1 on DS1. The first part can provide host connectivity to only DS1 (e.g., connectivity to V1 and thus the stretched LUN on DS1) but not DS2 (e.g., not V2 on DS1). Once the first part is complete but prior to configuring host connectivity to DS2, queried first target ports of DS1 exposing V1 can report ALUA path states to the host regarding the first target ports of DS1 with respect to V1 but not V2 on DS2. Once the first part is complete, a user can perform a second part of the configuration to configure and establish host access to V2 on DS2, wherein both V1 and V2 are configured to have the same identity such as presented to the host as the same stretched LUN L. Once the foregoing first part and the second part of the configuration are complete, queried first target ports of DS1 exposing V1 as the LUN L and also queried second target ports of DS2 exposing V2 as the LUN L should report ALUA path states to the host regarding 1) the first target ports of DS1 exposing the LUN L to the host, and also 2) the second target ports of DS2 exposing the LUN L to the host. Once the second part of the host access configuration is complete on DS2, ALUA path state information (which can be maintained on both DS1 and DS2) needs to be updated to reflect the established fully populated configuration. Thus, coordination and communication regarding current ALUA path state information for established and configured portions of connectivity can occur between DS1 and DS2 in order to have target ports of DS1 and DS2 report ALUA path state information, for example, when host connectivity is only partially established, such as with respect to one of the data storage systems but not the other. Additionally, coordination and communication of ALUA path state information can occur between DS1 and DS2 in order to have both systems report ALUA path state information for the established fully populated configuration of uniform host attachment in response to RTPG commands regarding the stretched LUN L.

Accordingly, described in the following paragraphs are techniques that can be used in connection with efficiently reporting ALUA path state information for uniform host connectivity regarding stretched LUNs. In at least one embodiment, such reported information regarding ALUA path state information regarding a stretched LUN can be reported by a data storage target port of a data storage system. The reported ALUA path state information can be reported by the target port in response to the target port receiving a command request or query such as in response to the target port receiving a RTPG command from an initiator port of a host. The RTPG command can be issued by the initiator port over a particular path between the initiator port and the target port with respect to a particular LUN, such as a stretched LUN.

In accordance with the techniques of the present disclosure in at least one embodiment, the target configuration to be established for a host can be host uniform connectivity with respect to the stretched LUN L configured from V1 on DS1 and V2 on DS2, where V1 and V2 are configured to have the same identity of "LUN L" and where V1 and V2 are exposed to the host as LUN L over paths from both DS1 and DS2. Assume that for the host H1, host connectivity to DS1 is configured first in time prior to configuring host connectivity to DS2 with respect to the stretched LUN L. When host access to V1 configured as LUN L is only configured on DS1 but not DS2, the ALUA path state information reported by any target ports of DS1 exposing V1 (configured as the LUN L) can include ALUA path state information for the LUN L for both target ports of DS1 and also target ports of DS2. Put another way, in accordance with the techniques of the present disclosure, target ports of DS1 can report ALUA path state information regarding the fully populated uniform host connectivity for H1 with respect to LUN L even though such uniform host connectivity has not yet been completed or established where, for example, the host H1 connectivity with respect to DS2 and LUN L is not yet configured but the host connectivity with respect to DS1 and the LUN L is configured (e.g., only partial host connectivity has been configured and established such that the LUN L is exposed to H1 over paths from DS1 but the LUN L is not exposed to H1 over paths from DS2).

In at least one embodiment in accordance with the present disclosure, connectivity for V1 configured as the LUN L on DS1 can be completed or established prior to configuring and prior to establishing V2 as LUN L on DS2. In accordance with the techniques of the present disclosure, when configuring DS1, configuration information regarding the target configuration of a fully populated configuration with uniform host connectivity for H1 with respect to the stretched LUN L can be specified and stored on DS1 such as in a database (DB). In one aspect, the configuration information of the DB specifying the fully populated uniform host attachment for H1 with respect to the stretched LUN L can be characterized, at least in part, as including predetermined configuration information regarding connectivity to DS2 and the stretched LUN L since connectivity can be established with respect to DS1 so that V1 (configured as the stretched LUN L) is exposed over target ports of DS1 to H1, but where there can be no connectivity established with respect to H1, DS2 and the stretched LUN L (e.g., where there is no V2 configured as the LUN L exposed over target ports of DS2 to H1). In this manner, the RTPG command requesting information regarding LUN L can be issued from an initiator I1 of H1 to a target port T1 of DS1. In response, T1 can use the configuration information in the DB of DS1 to report the fully populated host uniform attached for H1 with respect to the stretched LUN L when H1-DS1 connectivity for LUN L has been established but H1-DS2 connectivity for LUN L has not yet been established. Put another way, in response to the foregoing RTPG command regarding LUN L, T1 can use the predetermined configuration information in the DB of DS1 to report the fully populated host uniform attached for H1 with respect to the stretched LUN L when the LUN L (e.g., configured from the volume V1 on DS1) is exposed to H1 over target ports of DS1 and when the LUN L is not exposed to H1 over target ports of DS2. Thus the reported ALUA path state information reported by the queried DS1 target port T1 may not be current regarding one or more other target ports of DS2. In this manner, the host H1 can further perform additional discovery processing and issue one or more RTPG commands regarding the LUN L to the one or more target ports of DS2 to obtain current information regarding LUN L with respect to the one or more target ports of DS2. If connectivity to DS2 for the LUN L and the host H1 is not established, a RTPG to target port T2 of DS2 regarding LUN L can result in the host H1 discovering that the LUN L is currently unmapped or not currently exposed over T2 to H1. In a similar manner, other RTPG commands issued from H1 to other target ports of DS2 also result in obtaining current information regarding LUN L as unmapped or not exposed with respect to such queried target ports of DS2.

In at least one embodiment in accordance with the techniques of the present disclosure, each of DS1 and DS2 can be configured individually and initially provided with the complete fully populated uniform host connectivity configuration as information to be returned in response to a RTPG command received by the particular DS from the host H1 regarding the stretched LUN L once the particular DS has been configured to expose its corresponding one of the volume pair (V1, V2). Once uniform host connectivity of the fully populated configuration for the host H1 to the stretched LUN L has been established for both DS1 and DS2 (e.g., where both V1 of DS1 and V2 of DS2 are exposed to the host H1), DS1 and DS2 can further communicate and coordinate ALUA path state and other information regarding the stretched LUN L. The target state of the fully populated configuration of uniform host connectivity with ALUA path state information can be preconfigured on each data storage system DS1 and DS2 as each such system is individually configured, and where once the stretched LUN L is exposed by one of the data storage systems, such preconfigured information can be reported in response to a RTPG command received by the data storage system. In this manner, prior to completing and establishing the fully populated configuration on both DS1 and DS2, DS1 can, for example, report the fully populated configuration of uniform host attachment to H1 with respect to the LUN L even when host connectivity for the LUN L has not yet been established between H1 and DS2.

The techniques of the present disclosure can be used to reduce the communication and coordination of ALUA path state information between the data storage systems of the metro cluster such as prior to establishing and completing the fully populated configuration with respect to a host and its associated host uniform connectivity. Additionally, as further discussed below, the techniques of the present disclosure can be characterized as leveraging the concepts of "current" ALUA path state information and an authoritative target port which is queried using a RPTG command in order to ensure that a host obtains complete and accurate path state information regarding a stretched LUN. In this manner, the host can discover current, up to date, accurate ALUA path state information regarding paths across multiple data storage systems exposing the stretched LUN so that the host knows which particular paths to use for issuing I/Os directed to the stretched LUN at various points in time prior to completing the fully populated configuration for uniform host access.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 can be connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 can be connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. The flash devices can be constructed, for example, using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs that can be used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 can also provide data to the host systems 14a-n also through the channels. The host systems 14a-n do not address the drives or devices 16a-16n of the storage systems directly, but rather access to data can be provided to one or more host systems from what the host systems view as a plurality of logical devices, logical volumes (LVs) which may also referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. The LUNs may or may not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application such as can execute in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path can include commands that query or read selected portions of the data storage system configuration, such as information regarding the properties or attributes of one or more LUNs. The management commands can also include commands that write, update, or modify the data storage system configuration, such as, for example, to create or provision a new LUN (e.g., which result in modifying one or more database tables such as to add information for the new LUN), to modify an existing replication schedule or configuration (e.g., which result in updating existing information in one or more database tables for the current replication schedule or configuration), to delete a LUN (e.g., which include deleting the LUN from a table of defined LUNs and can also include modifying one or more other database tables to delete any existing snapshots of the LUN being deleted), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique which can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each can have their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like. Consistent with other discussion herein, the management commands can result in processing that includes reading and/or modifying information in the database storing data storage system configuration information. For example, management commands that read and/or modify the data storage system configuration information in the database can be issued over the control path to provision storage for LUNs, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path can differ. For example, although both control path and data path generally use a network for communications, some of the hardware and software used can differ. For example, with reference to the FIG. 1, a data storage system can have a separate physical connection 29 from a management system 22a to the data storage system 12 being managed whereby control commands are issued over such a physical connection 29. However, it can be that user I/O commands are never issued over such a physical connection 29 provided solely for purposes of connecting the management system to the data storage system. In any case, the data path and control path each define two separate logical flow paths.

Figure 2:
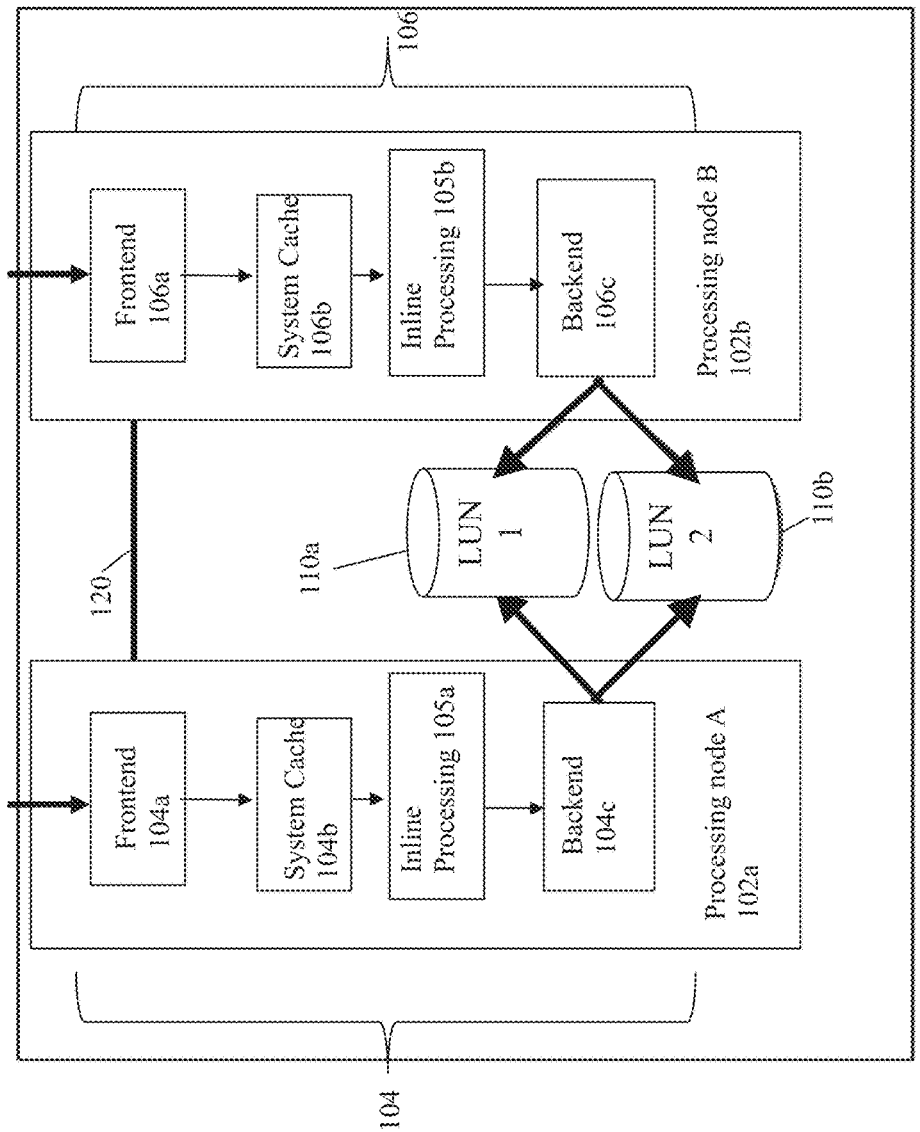
FIG. 2 is an example illustrating the I/O path or data path in connection with processing data in an embodiment in accordance with the techniques herein.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM such as can be used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as a synchronous mode described elsewhere herein.

Figure 3:
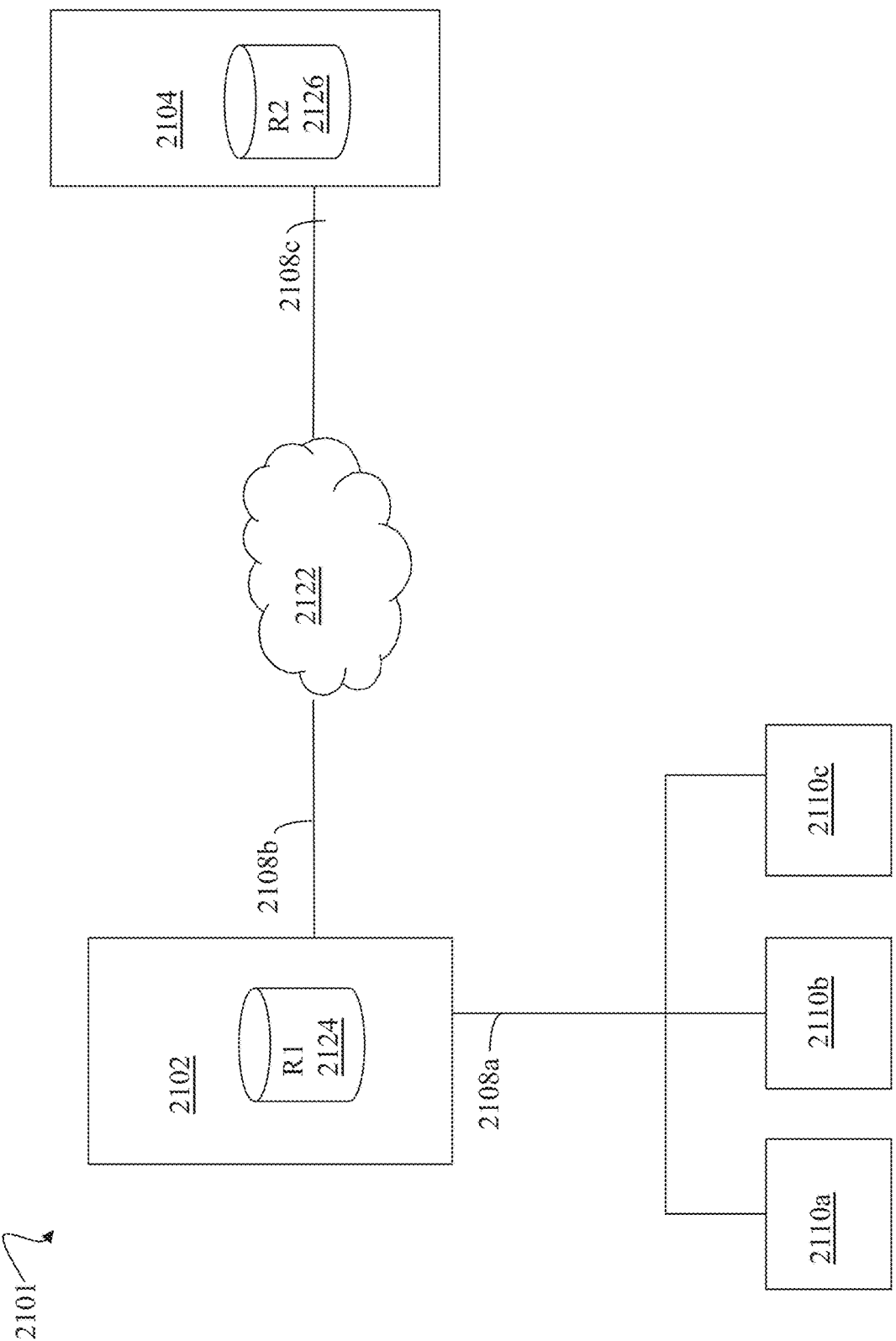
FIG. 3 is an example of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 can be remotely connected and communicate over the network 2122, such as the Internet or other private network, and facilitate communications with the components connected thereto. The hosts 2110a, 2110b and 2110c can perform operations to the data storage system 2102 over the connection 2108a. The hosts 2110a, 2110b and 2110c can be connected to the data storage system 2102 through the connection 2108a which can be, for example, a network or other type of communication connection.

The data storage systems 2102 and 2104 can include one or more devices. In this example, the data storage system 2102 includes the storage device R1 2124, and the data storage system 104 includes the storage device R2 2126. Both of the data storage systems 2102, 2104 can include one or more other logical and/or physical devices. The data storage system 2102 can be characterized as local with respect to the hosts 2110a, 2110b and 2110c. The data storage system 104 can be characterized as remote with respect to the hosts 2110a, 2110b and 2110c. The R1 and R2 devices can be configured as LUNs.

The host 1210a can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary storage device and a second storage device, such as R2, as a secondary storage device.

In this example, the host 2110a interacts directly with the device R1 of the data storage system 2102, and any data changes made are automatically provided to the R2 device of the data storage system 2104 by a remote replication facility (RRF). In operation, the host 110a can read and write data using the R1 volume in 2102, and the RRF can handle the automatic copying and updating of data from R1 to R2 in the data storage system 2104. Communications between the storage systems 2102 and 2104 can be made over connections 2108b, 2108c to the network 2122.

A RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

With synchronous mode remote data replication, a host 2110a can issue a write to the R1 device 2124. The primary or R1 data storage system 2102 stores the write data in its cache at a cache location and marks the cache location as including write pending (WP) data as mentioned elsewhere herein. The RRF operating in the synchronous mode can propagate the write data across an established connection or link (more generally referred to as a the remote replication link or link) such as over 2108b, 2122, and 2108c, to the secondary or R2 data storage system 2104 where the write data can be stored in the cache of the system 2104 at a cache location that is marked as WP. Once the write data is stored in the cache of the system 2104 as described, the R2 data storage system 2104 can return an acknowledgement to the R1 data storage system 2102 that it has received the write data. Responsive to receiving this acknowledgement from the R2 data storage system 2104, the R1 data storage system 2102 can return an acknowledgement to the host 2110a that the write has been received and completed. Thus, generally, R1 device 2124 and R2 device 2126 can be logical devices, such as LUNs, configured as mirrors of one another. R1 and R2 devices can be, for example, fully provisioned LUNs, such as thick LUNs, or can be LUNs that are thin or virtually provisioned logical devices.

Figure 4:
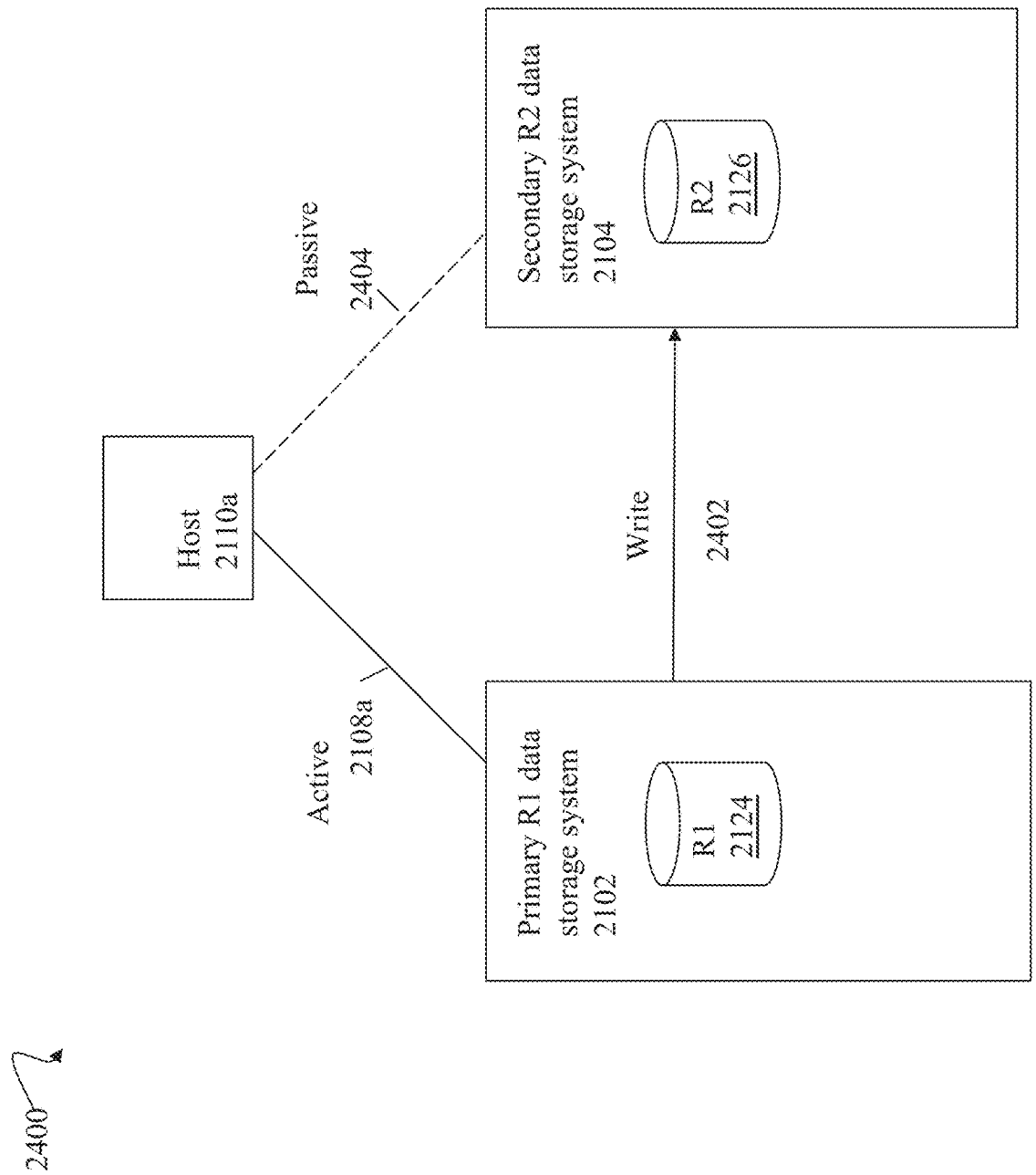
FIG. 4 is an example illustrating an active-passive replication arrangement.

With reference to FIG. 4, shown is a further simplified illustration of components that can be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, can also be used in connection with other information and communications exchanged between the systems 2101 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 can also be referred to herein as an active-passive configuration such as can be used with synchronous replication and other supported replication modes where the host 2110a has an active connection or path 2108a over which all I/Os are issued to only the R1 data storage system. The host 2110a can have a passive connection or path 2404 to the R2 data storage system 2104.

In the configuration of 2400, the R1 device 2124 and R2 device 2126 can be configured and identified as the same LUN, such as LUN A, to the host 2110a. Thus, the host 2110a can view 2108a and 2404 as two paths to the same LUN A, where path 2108a is active (over which I/Os can be issued to LUN A) and where path 2404 is passive (over which no I/Os to the LUN A can be issued). For example, the devices 2124 and 2126 can be configured to have the same logical device identifier such as the same world wide name (WWN) or other identifier as well as having other attributes or properties that are the same. Should the connection 2108a and/or the R1 data storage system 2102 experience a failure or disaster whereby access to R1 2124 configured as LUN A is unavailable, processing can be performed on the host 2110a to modify the state of path 2404 to active and commence issuing I/Os to the R2 device configured as LUN A. In this manner, the R2 device 2126 configured as LUN A can be used as a backup accessible to the host 2110a for servicing I/Os upon failure of the R1 device 2124 configured as LUN A.

The pair of devices or volumes including the R1 device 2124 and the R2 device 2126 can be configured as the same single volume or LUN, such as LUN A. In connection with discussion herein, the LUN A configured and exposed to the host can also be referred to as a stretched volume or device, where the pair of devices or volumes (R1 device 2124, R2 device 2126) is configured to expose the two different devices or volumes on two different data storage systems to a host as the same single volume or LUN. Thus, from the view of the host 2110a, the same LUN A is exposed over the two paths 2108a and 2404.

It should be noted although only a single replication link 2402 is illustrated, more generally any number of replication links can be used in connection with replicating data from systems 2102 to system 2104.

Figure 5:
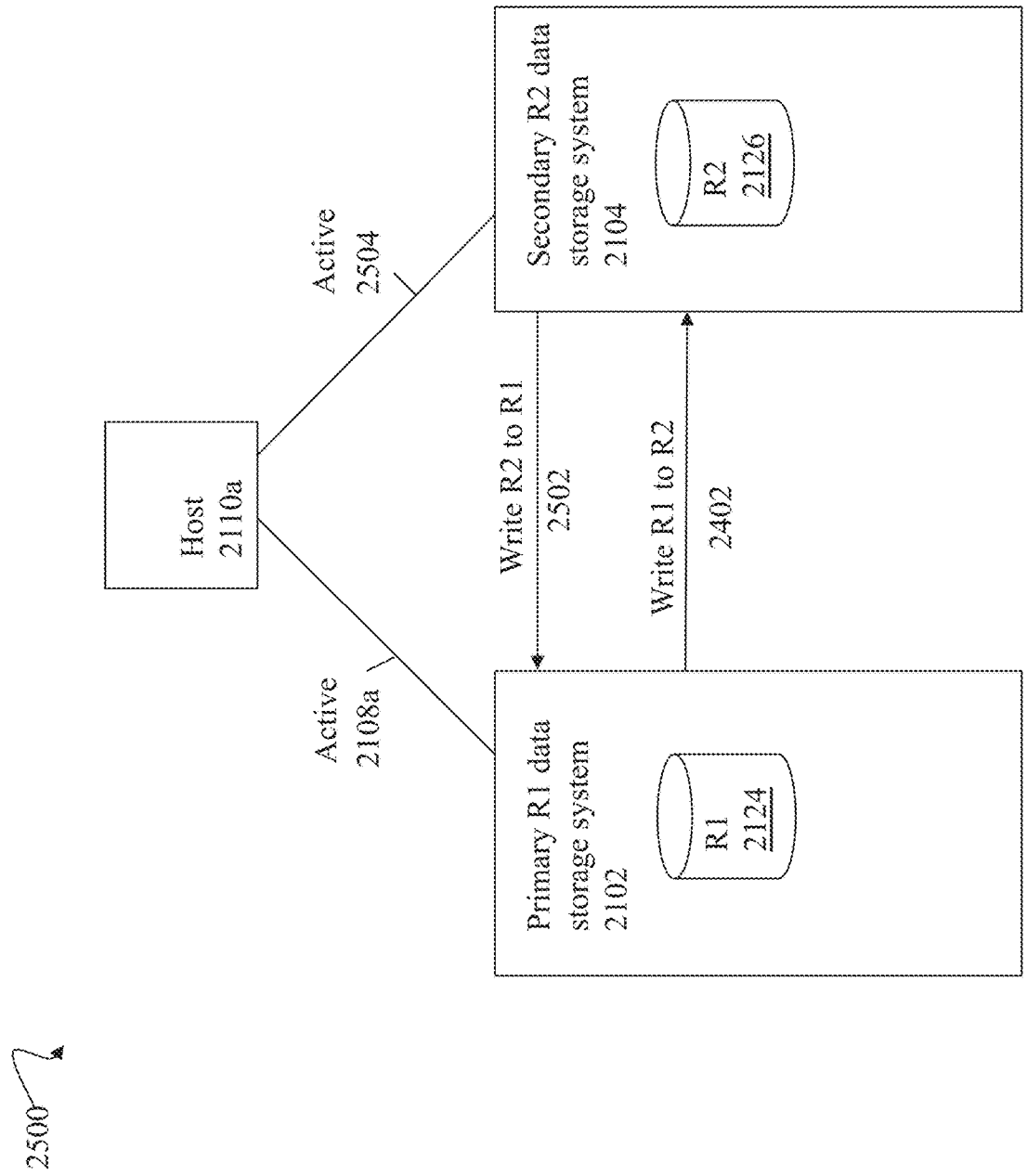
FIG. 5 is an example illustrating an active-active arrangement with a stretched volume in an embodiment in accordance with the techniques herein.

Referring to FIG. 5, shown is an example configuration of components that can be used in an embodiment in accordance with the techniques herein. The example 2500 illustrates an active-active configuration as can be used in connection with synchronous replication in at least one embodiment in accordance with the techniques herein. In the active-active configuration with synchronous replication, the host 2110a can have a first active path 2108a to the R1 data storage system and R1 device 2124 configured as LUN A. Additionally, the host 2110a can have a second active path 2504 to the R2 data storage system and the R2 device 2126 configured as the same LUN A. From the view of the host 2110a, the paths 2108a and 2504 appear as 2 paths to the same LUN A as described in connection with FIG. 4 with the difference that the host in the example 2500 configuration can issue I/Os, both reads and/or writes, over both of the paths 2108a and 2504 at the same time. The host 2110a can send a first write over the path 2108a which is received by the R1 system 2102 and written to the cache of the R1 system 2102 where, at a later point in time, the first write is destaged from the cache of the R1 system 2102 to physical storage provisioned for the R1 device 2124 configured as the LUN A. The R1 system 2102 also sends the first write to the R2 system 2104 over the link 2402 where the first write is written to the cache of the R2 system 2104, where, at a later point in time, the first write is destaged from the cache of the R2 system 2104 to physical storage provisioned for the R2 device 2126 configured as the LUN A. Once the first write is written to the cache of the R2 system 2104, the R2 system 2104 sends an acknowledgement over the link 2402 to the R1 system 2102 that it has completed the first write. The R1 system 2102 receives the acknowledgement from the R2 system 2104 and then returns an acknowledgement to the host 2110a over the path 2108a, where the acknowledgement indicates to the host that the first write has completed.

The host 2110a can also send a second write over the path 2504 which is received by the R2 system 2104 and written to the cache of the R2 system 2104 where, at a later point in time, the second write is destaged from the cache of the R2 system 2104 to physical storage provisioned for the R2 device 2126 configured as the LUN A. The R2 system 2104 also sends the second write to the R1 system 2102 over a second link 2502 where the second write is written to the cache of the R1 system 2102, and where, at a later point in time, the second write is destaged from the cache of the R1 system 2102 to physical storage provisioned for the R1 device 2124 configured as the LUN A. Once the second write is written to the cache of the R1 system 2102, the R1 system 2102 sends an acknowledgement over the link 2502 to the R2 system 2104 that it has completed the second write. Once the R2 system 2104 receives the acknowledgement from the R1 system (regarding completion of the second write), the R2 system 2104 then returns an acknowledgement to the host 2110a over the path 2504 that the second write has completed.

As discussed in connection with FIG. 4, the FIG. 5 also includes the pair of devices or volumes—the R1 device 2124 and the R2 device 2126—configured as the same single stretched volume, the LUN A. From the view of the host 2110a, the same stretched LUN A is exposed over the two active paths 2504 and 2108a.

In the example 2500, the illustrated active-active configuration includes the stretched LUN A configured from the device or volume pair (R1 2124, R2 2126), where the device or object pair (R1 2124, R2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication: synchronous remote replication of writes from R1 2124 to R2 2126, and synchronous remote replication of writes from R2 2126 to R1 2124. To further illustrate synchronous remote replication from the system 2102 to the system 2104 for the stretched LUN A, a write to the stretched LUN A sent over 2108a to the system 2102 is stored on the R1 device 2124 and also transmitted to the system 2104 over 2402. The write sent over 2402 to system 2104 is stored on the R2 device 2126. Such replication is performed synchronously in that the received host write sent over 2108a to the data storage system 2102 is not acknowledged as successfully completed to the host 2110a unless and until the write data has been stored in caches of both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the R2 device 2124. Such replication is performed synchronously in that the acknowledgement to the host write sent over 2504 is not acknowledged as successfully completed unless and until the write data has been stored in the caches of both the systems 2102 and 2104.

It should be noted that although FIG. 5 illustrates for simplicity a single host accessing both the R1 device 2124 and R2 device 2126, any number of hosts can access one or both of the R1 device 2124 and the R2 device 2126.

Although only a single link 2402 is illustrated in connection with replicating data from systems 2102 to system 2104 in connection with techniques herein, more generally any number of links can be used. Although only a single link 2502 is illustrated in connection with replicating data from systems 2104 to system 2102, more generally any number of links can be used. Furthermore, although 2 links 2402 and 2502 are illustrated, in at least one embodiment, a single link can be used in connection with sending data from system 2102 to 2104, and also from 2104 to 2102.

FIG. 5 illustrates an active-active remote replication configuration for the stretched LUN A. The stretched LUN A is exposed to the host by having each volume or device of the device pair (R1 device 2124, R2 device 2126) configured and presented to the host as the same volume or LUN A. Additionally, the stretched LUN A is configured for two way synchronous remote replication between the two devices or volumes of the device pair.

In an embodiment described herein, the data storage system can be a SCSI-based system such as SCSI-based data storage array. An embodiment in accordance with the techniques herein can include hosts and data storage systems which operate in accordance with the standard SCSI Asymmetrical Logical Unit Access (ALUA). The ALUA standard specifies a mechanism for asymmetric or symmetric access of a logical unit or LUN as used herein. ALUA allows the data storage system to set a LUN's access state with respect to a particular initiator port and the target port. Thus, in accordance with the ALUA standard, various access states (also sometimes referred to herein as ALUA states or path states) can be associated with a path with respect to a particular device, such as a LUN. In particular, the ALUA standard defines such access states including the active-optimized, active-non optimized, and unavailable states as described herein. The ALUA standard also defines other access states, such as standby and in-transition or transitioning (i.e., denoting that a particular path is in the process of transitioning between states for a particular LUN). A recognized path (such as recognized by a host as a result of discovery processing) over which I/Os (e.g., read and write I/Os) may be issued to access data of a LUN may have an "active" state, such as active-optimized or active-non-optimized. Active-optimized is an active path to a LUN that is preferred over any other path for the LUN having an "active-non optimized" state. A path for a particular LUN having the active-optimized path state may also be referred to herein as an optimized or preferred path for the particular LUN. Thus active-optimized denotes a preferred path state for the particular LUN. A path for a particular LUN having the active-non optimized (or unoptimized) path state may also be referred to herein as a non-optimized or non-preferred path for the particular LUN. Thus active-non-optimized denotes a non-preferred path state with respect to the particular LUN. Generally, I/Os directed to a LUN that are sent by the host to the data storage system over active-optimized and active-non optimized paths are processed by the data storage system. However, the host may select to send I/Os to a LUN from those paths having an active-optimized state for the LUN. The host may proceed to use a path having an active non-optimized state for the LUN only if there is no active-optimized path for the LUN. A recognized path over which I/Os may not be issued to access data of a LUN may have an "unavailable" state. When a path to a LUN is in the unavailable state, a limited set of non-I/O-based commands (e.g. other than read and write commands to, respectively, read and write user data), such as the SCSI INQUIRY or REPORT TARGET PORT GROUPS commands, can be issued. It should be noted that such limited set of non I/O based commands can also be issued over an active (e.g., active optimized and active non-optimized) path as well.

Figure 6:
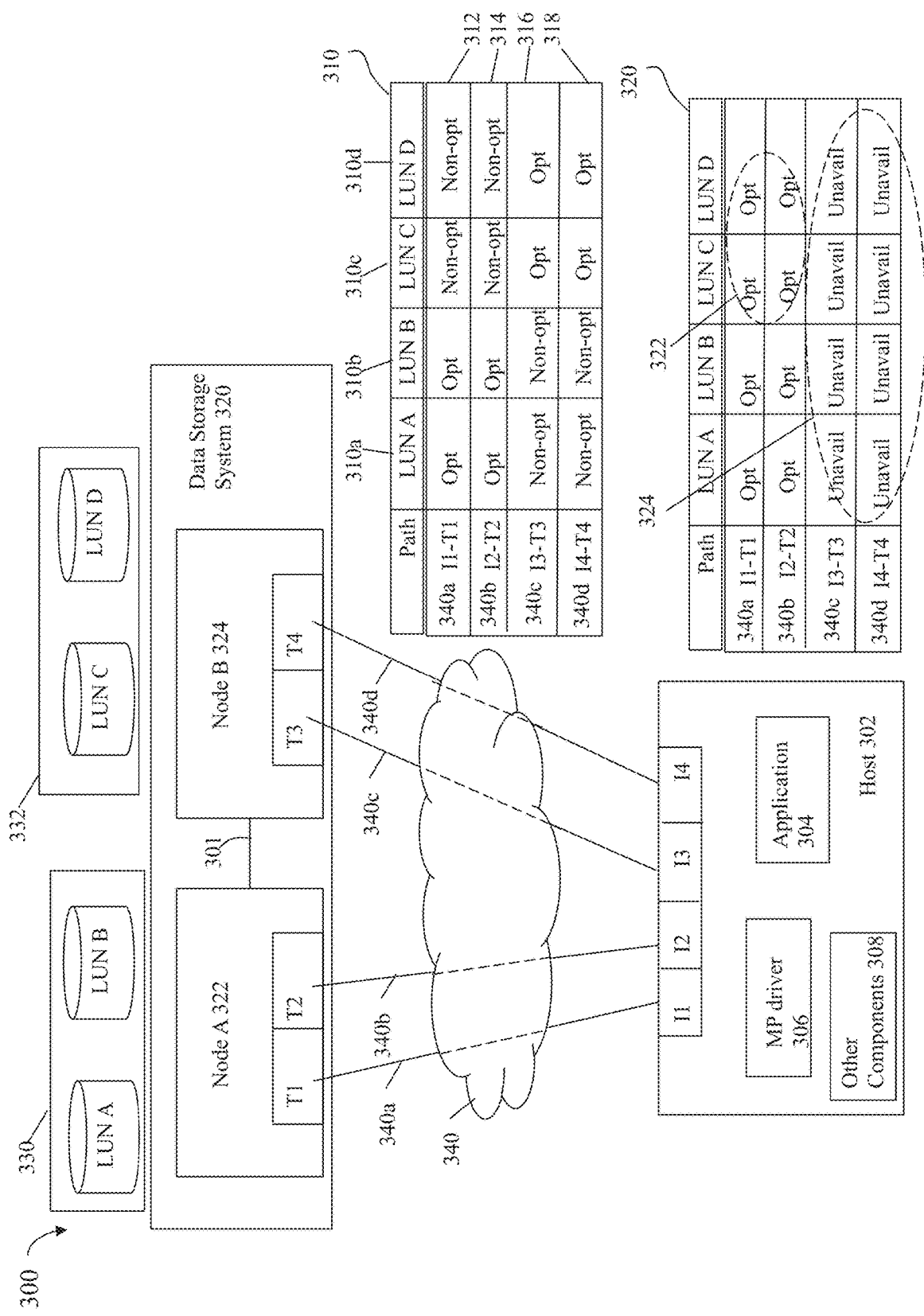
FIG. 6 is an example illustrating path states for paths between a host and a data storage system that can be used in an embodiment in accordance with the techniques herein.

Referring to FIG. 6, shown is an example of an embodiment of a system that can be utilized in connection with the techniques herein. The example 300 includes a host 302, a network 340 and a data storage system 320. The host 302 and the data storage system 320 can communicate over one or more paths 340a-d through the network 340. The paths 340a-d are described in more detail below. The LUNs A and B are included in the set 330, and the LUNs C and D are included in the set 332. The LUNs of the sets 330 and 332 are configured from non-volatile BE storage PDs of the data storage system 320. The data storage system includes two nodes—node A 322 and node B 324. The nodes 322, 324 can be as described elsewhere herein. The element 301 denotes an internode communication connection similar, for example, to the connection 120 of FIG. 2. Consistent with other discussion herein such as in connection with FIG. 2, the BE PDs from which storage is provisioned for the LUNs of 330, 332 are accessible to both the nodes 322, 324.

The host 202 can include an application 304, a multi-path (MP) driver 306 and other components 308. The other components 308 can include, for example, one or more other device drivers, an operating system, and other code and components of the host. An I/O operation from the application 304 can be communicated to the data storage system 320 using the MP driver 306 and one or more other components of the data path or I/O path. The application 304 can be a database or other application which issues data operations, such as I/O operations, to the data storage system 320. Each of the I/O operations can be directed to a LUN, such as one of the LUNs of 330, 332, configured to be accessible to the host 302 over multiple physical paths. As such, each of the I/O operations can be forwarded from the application 304 to the data storage system 320 over one of the possible multiple paths.

The MP driver 306 can include functionality to perform any one or more different types of processing such as related to multipathing. For example, the MP driver 306 can include multipathing functionality for management and use of multiple paths. For example, the MP driver 306 can perform path selection to select one of the possible multiple paths based on one or more criteria such as load balancing to distribute I/O requests for the target device across available active-optimized or preferred paths. Host side load balancing can be performed by the MP driver to provide for better resource utilization and increased performance of the host, data storage system, and network or other connection infrastructure. The host 302 can also include other components 308 such as one or more other layers of software used in connection with communicating the I/O operation from the host to the data storage system 120. For example, the element 108 can include Fibre Channel (FC), SCSI and NVMe (Non-Volatile Memory Express) drivers, a logical volume manager (LVM), and the like. It should be noted that element 308 can include software or other components used when sending an I/O operation from the application 304 where such components include those invoked in the call stack of the data path above the MP driver 306 and also below the MP driver 306. For example, application 304 can issue an I/O operation which is communicated in the call stack including an LVM, the MP driver 306, and a SCSI driver.

The data storage system 320 can include one or more BE PDs configured to store data of one or more LUNs. Each of the LUNs 330, 332 can be configured to be accessible to the host 302 through multiple paths. The node A 322 in this example has two data storage system target ports T1 and T2. The node B 324 in this example has two data storage system target ports T3 and T4. The host 302 includes 4 host initiator ports I1, I2, I3 and I4. The path 340a is formed using the endpoints I1 and T1 and may be denoted as I1-T1. The path 340b is formed using the endpoints I2 and T2 and can be denoted as I2-T2. The path 340c is formed using the endpoints I3 and T3 and can be denoted as I3-T3. The path 340d is formed using the endpoints I4 and T4 and can be denoted as I4-T4.

In this example, all of the LUNs A, B C and D can be accessible or exposed over all the data storage system target ports T1, T2, T3 and T4 over the paths 340a-d. As described in more detail below, a first set of paths to the node A 322 can be specified as active-optimized or preferred for the LUNs of the set 330 and a second set of paths to the node B 324 can be specified as active-optimized or preferred for the LUNs of the set 332. Additionally the first set of paths to the node A 322 can be specified as active-non optimized or non-preferred for the LUNs of the set 332 and the second set of paths to the node B 324 can be specified as active-non optimized or non-preferred for the LUNs of the set 330.

The multiple active paths allow the application I/Os to the LUNs A, B C and D to be routed over the multiple paths 340a-d and, more generally, allow the LUNs A, B C and D to be accessed over the multiple paths 340a-d. In the event that there is a component failure in one of the active-optimized multiple paths for a particular LUN, application I/Os directed to the particular LUN can be easily routed over other alternate preferred paths unaffected by the component failure. Additionally, in the event there are no preferred paths available for issuing I/Os to the particular LUN, non-preferred paths for the particular LUN can be used to send the I/Os to the particular LUN. Thus, an embodiment of the MP driver 306 can also perform other processing in addition to load balancing in connection with path selection. The MP driver 106 can be aware of, and can monitor, all paths between the host and the LUNs A, B C and D in order to determine that particular state of such paths with respect to the various LUNs. In this manner, the MP driver can determine which of the multiple paths over which a LUN is visible may be used for issuing I/O operations successfully. Additionally, the MP driver can use such information to select a path for host-data storage system communications issued to the particular LUN.

In the example 300, each of the LUNs A, B C and D can be exposed through the 4 paths 340a-d. As described in more detail below, each of the paths 340a-d can have an associated ALUA state also used by the host when issuing I/O operations. Each path 340a-d can be represented by two path endpoints—a first endpoint on the host 302 and a second endpoint on the data storage system 320. The first endpoint can correspond to a port of a host component, such as a host bus adapter (HBA) of the host 302, and the second endpoint can correspond to a target port of a data storage system component, such as a target port of a node of the data storage system 320. In the example 300, the elements I1, I2, I3 and I4 each denote a port of the host 302 (e.g. such as a port of an HBA), and the elements T1, T2 T3 and T4 each denote a target port of a node of the data storage system 320.

The MP driver 306, as well as other components of the host 302, can execute in kernel mode or other privileged execution mode. In one embodiment using a Unix-based operating system, the MP driver 306 can execute in kernel mode. In contrast, the application 304 can typically execute in user mode, or more generally, a non-privileged execution mode. Furthermore, it will be appreciated by those skilled in the art that the techniques herein can be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, the application 304 can issue one or more I/O operations (e.g., read and write commands or operations) directed to the LUNs 330, 332 of the data storage system. Such I/O operations from the application 304 can be directed to the MP driver 306 after passing through any intervening layers of the data or I/O path.

In connection with the SCSI standard, a path may be defined between two ports as described above. A command may be sent from the host (as well as a component thereof such as a HBA) and can be characterized as an initiator, originator or source with respect to the foregoing path. The host, as the initiator, sends requests to a data storage system (as well as a particular component thereof such as node having a port with a network address) characterized as a target, destination, receiver, or responder. Each physical connection of a path can be between a first endpoint which is an initiator port (e.g., I1) of the host and a second endpoint (e.g., T1) which is a target port of node in the data storage system. Over each such path, one or more LUNs can be visible or exposed to the host initiator through the target port of the data storage system.

In connection with some protocols such as the SCSI protocol, each path as related to sending and receiving of I/O commands can include 2 endpoints. As discussed herein, the host, or port thereof, can be an initiator with respect to I/Os issued from the host to a target port of the data storage system. In this case, the host and data storage system ports are examples of such endpoints. In the SCSI protocol, communication can be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system can be directed to a LUN and a logical address or location in the LUN's logical address space. The logical address or location of the LUN can be characterized as the target logical address of the I/O operation. The target logical address or location of the I/O operation can identify an LBA within the defined logical address space of the LUN. The I/O command can include various information such as identify the particular type of I/O command as read or write, identify the target logical address (e.g., LUN and LUN logical address) of the I/O command, and other information. In connection with servicing the I/O operation, the data storage system can map the target logical address to a physical storage location on a PD of the data storage system. The physical storage location can denote the physical storage allocated or provisioned and also mapped to the target logical address.

In an embodiment described herein, the data storage system 320 can be a SCSI-based system such as SCSI-based data storage array operating in accordance with the ALUA standard. As described herein, a data storage system in accordance with techniques herein can set an access path state for a particular LUN over a particular path from an initiator to a target of the data storage system. For example, the data storage system can set an access path state for a particular LUN on a particular path to active-optimized (also referred to herein as simply "optimized" or "preferred") to denote the path as a preferred path for sending I/Os directed to the LUN. The data storage system can set an access path state for a particular LUN on a particular path to active-non optimized (also referred to herein as simply "non-optimized" or "non-preferred") to denote a non-preferred path for sending I/Os directed to the LUN sent. The data storage system can also set the access path state for a particular LUN on a particular path to other suitable access states. Although discussion herein can refer to the data storage system setting and modifying the path access states of the paths between the host and the data storage system, in some embodiments, a host can also set and/or modify the path access states which are then communicated to the data storage system.

In accordance with the techniques herein, the data storage system can set the path state for a particular LUN to preferred or non-preferred for any suitable purpose. In at least one embodiment, multipathing software, such as the MP driver, on the host can monitor the particular access path state as may be set by the data storage system with respect to a particular LUN to determine which path to select for sending I/Os to the LUN. Thus, when the LUN is exposed to a host initiator over multiple paths (e.g., where the same LUN is accessible through multiple different target ports of the data storage system), the data storage system can vary the associated access state of each such path in order to vary and control the particular ones of the multiple paths over which the host can issue I/Os to the LUN.

The element 330 indicates that the LUN A and the LUN B are exposed to the host 302 over preferred paths to the node A 322 and non-preferred paths to the node B 324. The element 332 indicates that the LUN C and the LUN D are exposed to the host 302 over preferred paths to the node B 324 and non-preferred paths to the node A 322. Thus, the paths 340c-d to the target ports T3 and T4 of node B 324 are set to optimized or preferred for the LUNs C and D and set to non-optimized or non-preferred for the remaining LUNs A and B; and the paths 340a-b to the target ports T1 and T2 of node A 322 are set to preferred or optimized for the LUNs A and B and set to non-optimized or non-preferred for the remaining LUNs C and D.

In at least one embodiment, target ports are given identifiers and can be organized into target port groups (TPGs). In at least one embodiment, a TPG may be defined as a logical grouping or collection of one or more target port identifiers that share the same access characteristics for a particular LUN. For example, target ports T1 and T2 may be included in a first TPG and target ports T3 and T4 may be included in a second TPG. With ALUA in at least one embodiment, a LUN can be visible with respect to the entire TPG rather than on a port level basis. In other words, a LUN may be exposed or visible on a TPG level. If the LUN is visible or accessible on a first target port in the first TPG including that first target port, then the LUN is also accessible or visible on all targets ports of the first TPG. Each TPG can take on a state (e.g., preferred or non-preferred). For a given LUN, the LUN is visible on the TPG level basis (e.g. with respect to all target ports of a TPG). Thus the LUN has the same path state or access characteristic with respect to all target ports of the same TPG. For example, the first TPG noted above can include all target ports of one of the nodes such as node A 322 over which the LUNs A, B, C and D are exposed; and the second TPG noted above can include all target ports of one of the nodes such as node B 324 over which the LUNs A, B, C and D are exposed.

The table 310 denotes the different path states for each of the 4 paths for the 4 LUNs A, B, C and D. The table 310 reflects the path states as discussed above. The row 312 indicates that path I1-T1 including the target port T1 of node A 322 is active optimized (opt) or preferred for the LUNs A and B and active non-optimized (non-opt) or non-preferred for the LUNs C and D. The row 314 indicates that path I2-T2 including the target port T2 of node A 322 is optimized (opt) or preferred for the LUNs A and B and non-optimized (non-opt) or non-preferred for the LUNs C and D. The row 316 indicates that path I3-T3 including the target port T3 of node B 324 is optimized (opt) or preferred for the LUNs C and D and non-optimized (non-opt) or non-preferred for the LUNs A and B. The row 318 indicates that path I4-T4 including the target port T4 of node B 324 is optimized (opt) or preferred for the LUNs C and D and non-optimized (non-opt) or non-preferred for the LUNs A and B.

Assume further, for example, the node B 324 of the data storage system 320 now experiences a failure so that the target ports T3 and T4 and thus the paths 340c, 340d are unavailable. In response to the failure of the node B 324 and the target ports T3 and T4, the path states can be updated from the states of the table 310 to the revised path states of the table 320. In the table 320, due to the failure and unavailability of the paths 340c-d, 1) the path states of 322 indicate that the path 340a I1-T1 and the path 340b I2-T2 have transitioned from the non-optimized to the optimized or preferred path state for the LUNs C and D; and 2) the path states of 324 indicate that the path I3-T3 340c and the path 340d I4-T4 for the LUNs A, B, C and D have transitioned to the unavailable state.

It is noted that other embodiments can have different path state changes than as denoted by the table 320.

A metro cluster configuration can be used herein to refer to a configuration including two data storage systems respectively configured with two devices or volumes with the same identity that cooperate to expose a stretched volume or LUN, such as in the FIGS. 4 and 5, to one or more hosts. In the metro cluster configuration, the hosts and applications running on the hosts perceive the two devices or volumes configured to have the same identity as the same single stretched volume, device or LUN.

In a metro cluster configuration, each of the two data storage systems can be in different data centers or can be in two server rooms or different physical locations within the same data center. The metro cluster configuration may be used in a variety of different use cases such as, for example, increased availability and disaster avoidance and DR, resource balancing across data centers and data storage systems, and storage migration.

In a metro cluster configuration, hosts can be configured with uniform host connectivity or attachment as illustrated in FIGS. 4 and 5, where a host can be connected to both data storage systems exposing the pair of devices or volumes configured as the same stretched volume or LUN, such as the LUN A described in connection with FIG. 5. From the perspective of the host 2110a of FIG. 5, the data storage system 2102 can be a local data storage system included in the same data center as the host 2110a, and the data storage system 2104 can be a remote data storage system included in a different data center. Thus the host 2110a is configured with uniform host connectivity. In contrast to uniform host connectivity is non-uniform host connectivity, where the host is only connected to the local data storage system but not the remote data storage system of the metro cluster configuration.

Figure 7A:
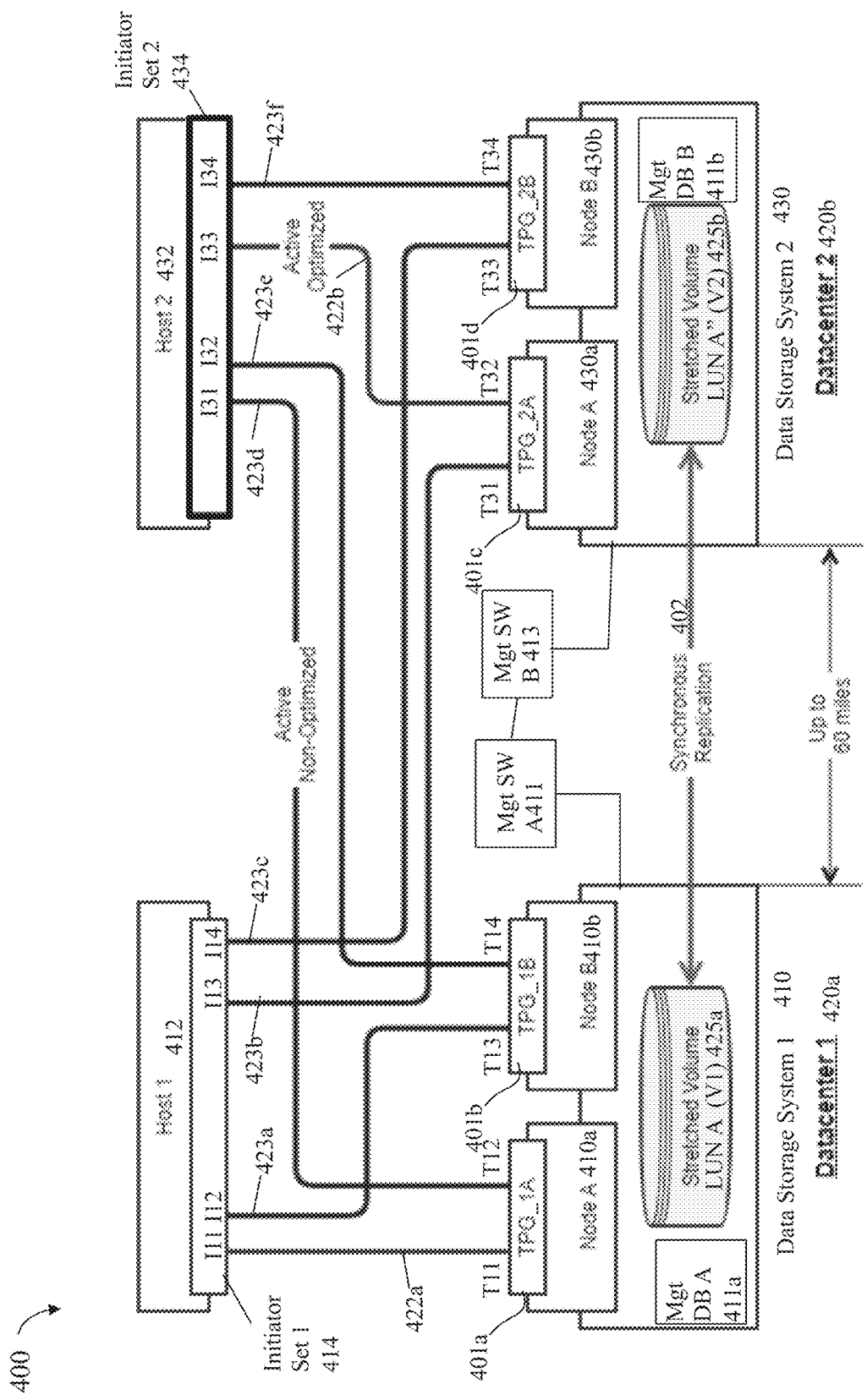
FIGS. 7A, 7B and 10 are examples illustrating path states for paths between multiple data storage systems and multiple hosts in a metro cluster configuration with a stretched volume in embodiments in accordance with the techniques herein.

Referring to FIG. 7A, shown is a more detailed illustration of a metro cluster configuration. The example 400 includes a stretched volume or LUN A and two hosts configured 412, 414 with uniform host connectivity in at least one embodiment in accordance with the techniques herein.

In the FIG. 7A, the host 1 412 and the data storage system 1 410 are in the data center 1 420a. The host 2 414 and the data storage system 2 430 are in the data center 2 420b. The host 1 412 includes the initiators I11-I14. The host 432 includes the initiators I31-I34. The data storage systems 410, 430 may be dual node data storage systems such as described elsewhere herein (e.g., FIG. 2). The data storage system 410 includes the node A 410a with the target ports T11-T12, and the node B 410b with the target ports T13-T14. The data storage system 430 includes the node A 430a with the target ports T31-T32, and the node B 430b with the target ports T33-T34. From the perspective of host 1 412, the data storage system 1 410 and data center 1 420a can be characterized as local, and the data storage system 2 430 and the data center 2 420b can be characterized as remote. From the perspective of host 2 432, the data storage system 1 410 and data center 1 420a can be characterized as remote, and the data storage system 2 430 and the data center 2 420b can be characterized as local.

As illustrated in the FIG. 7A, the stretched volume or LUN A is configured from the device or volume pair LUN A 425*a* and LUN A" 425*b*, where both the LUNs or volumes 425*a-b* are configured to have the same identity of "LUN A" from the perspective of the hosts 412, 432. It should be noted that the volume 425*b* is shown as LUN A" in the FIG. 7A to distinguish from the paired volume 425*a* even though both volumes 425*a-b* are configured to have the same identity of LUN A. The LUN A 425*a* and the LUN A" 425*b* are configured for two way synchronous remote replication 402 which, consistent with other description herein, provides for automated synchronous replication of writes of the LUN A 425*a* to the LUN A" 425*b*, and also automated synchronous replication of writes of the LUN A" 425*b* to the LUN A 425*a*. The LUN A 425*a* may be exposed to the hosts 412, 432 over the target ports T11-T14 of the system 410, and the LUN A" 425*b* can be exposed to the hosts 412, 432 over the target ports T31-T34. Thus, the volume pair 425*a-b* denoted (V1 425*a*, V2, 425*b*) are configured to have the same LUN ID of LUN A so that the hosts 412, 432 identify both volumes 425*a-b* as the same stretched LUN A.

In at least one embodiment in which the arrangement of FIG. 7A is in accordance with the ALUA protocol, the paths 423*a-f* can be configured with the path state of active non-optimized and the paths 422*a-b* can be configured with the path state of active optimized.

Thus, the host 412 has uniform host connectivity to the stretched volume or LUN A by the active connections or paths 422*a* (I11-T11), 423*a* (I12-T13) to the data storage system 410 exposing the LUN A 425*a*, and the active connections or paths 423*b* (I13-T31), 423*c* (I14-T33) to the data storage system 430 exposing the LUN A" 425*b*. The host 432 has uniform host connectivity to the stretched volume or LUN A by the active connections or paths 423*d* (I31-T12), 423*e* (I32-T14) to the data storage system 410 exposing the LUN A 425*a*, and the active connections or paths 422*b* (I33-T32), 423*f* (I34-T34) to the data storage system 430 exposing the LUN A" 425*b*.

Uniform host connectivity deployments such as illustrated in FIG. 7A offer high resiliency to failure of any local component or cross data center connection. Failures such as a total loss of a local storage system (that is local from a host's perspective) result in the host performing I/Os using the cross-datacenter links to the remote data storage system, which results in increased latency but does not require immediate application restart since I/Os issued from the host are still serviced using the remote data storage system. FIG. 7A illustrates a configuration that may also be referred to as a metro cluster configuration with a pair of data storage systems 410, 430 and uniform host connectivity or attachment. With respect to a host, such as the host 412, one of the data storage systems, such as the system 410, may be local and in the same data center as the host, and the other remaining data storage system, such as the system 430, may be remote and in a different location or data center than the host 412. The host, such as the host 412, has uniform host connectivity in that the host 412 is located in one data center but is connected to both data storage system 410, 430. In a similar manner, the host 432 also has uniform host connectivity to both system 410, 430.

With reference to FIG. 7A, the element 411 denotes the data storage system management software application A for the system 410, and the element 413 denotes the data storage system management application B for the system 430. The management applications 411 and 413 can communicate with one another through a network or other suitable communication connection when performing the processing needed for the techniques described herein. The element 411*a* represents the management database (DB) A that stores management and other information used by the management application A 411 for the system 410. The element 413*a* represents the management DB B that stores management and other information used by the management application B 413 for the system 430.

To further illustrate, the FIG. 7A can denote the path states at a first point in time T1. At a second point in time T2 subsequent to T1 and illustrated in the FIG. 7B, the data storage system 2 430 can experience a failure or disaster where the LUN A" 425*b* on data storage on the system 430 is unavailable and cannot be accessed through the target ports T31-34. In response to the unavailability of the data storage system 430, the host 2 432 uses the path 454*b* to issue I/Os to the LUN A 425*a* on the data storage system 410. Thus, failure of the system 430 that is local to the host 432 results in the host 432 performing I/Os using the cross-data center link 454*b* to the remote system 410 which results in increased latency but does not require immediate application restart since I/Os issued by the application 3 (app 3) on the host 432 may still be serviced using the remote system 410.

In response to the unavailability of the data storage system 430, the paths 452*a-d* to the system 430 transition to the unavailable path state, the path 454*a* remains active optimized, the path 454*b* transitions from active non-optimized to active optimized, and the remaining paths 456*a-b* remain active non-optimized.

FIG. 7A illustrates connectivity between the hosts 412, 432 and the data storage systems 410, 430 under normal operating conditions where both systems 410, 430 and both volumes or LUNs 425*a*, 425*b* are available to the hosts 412, 432 for servicing I/Os. In such normal operating conditions, the ALUA path states can be as described in connection with FIG. 7A where each of the hosts 412, 432 issues I/Os to the particular one of the systems 410, 430 that is local or in the same data center as the particular host. In such normal operating conditions as illustrated in FIG. 7A, at least one "local path" between the host and the local data storage system is active optimized, and remote paths between the host and the remote data storage system are active non-optimized. One or more of the remote paths with respect to a particular host can be used in the event the local data storage system and/or local paths to the local data storage system are unavailable such as described in connection with FIG. 7B with respect to the host 412.

Thus, in the absence of a data storage system failure and under normal operating conditions such as illustrated in FIG. 7A, the host 412 issues I/Os to its local data storage system 410 where the host 412 and the system 410 are located in the same data center 420*a*; and the host 432 issues I/Os to its local data storage system 430 where the host 432 and the system 430 are located in the same data center 420*b*.

Figure 7B:
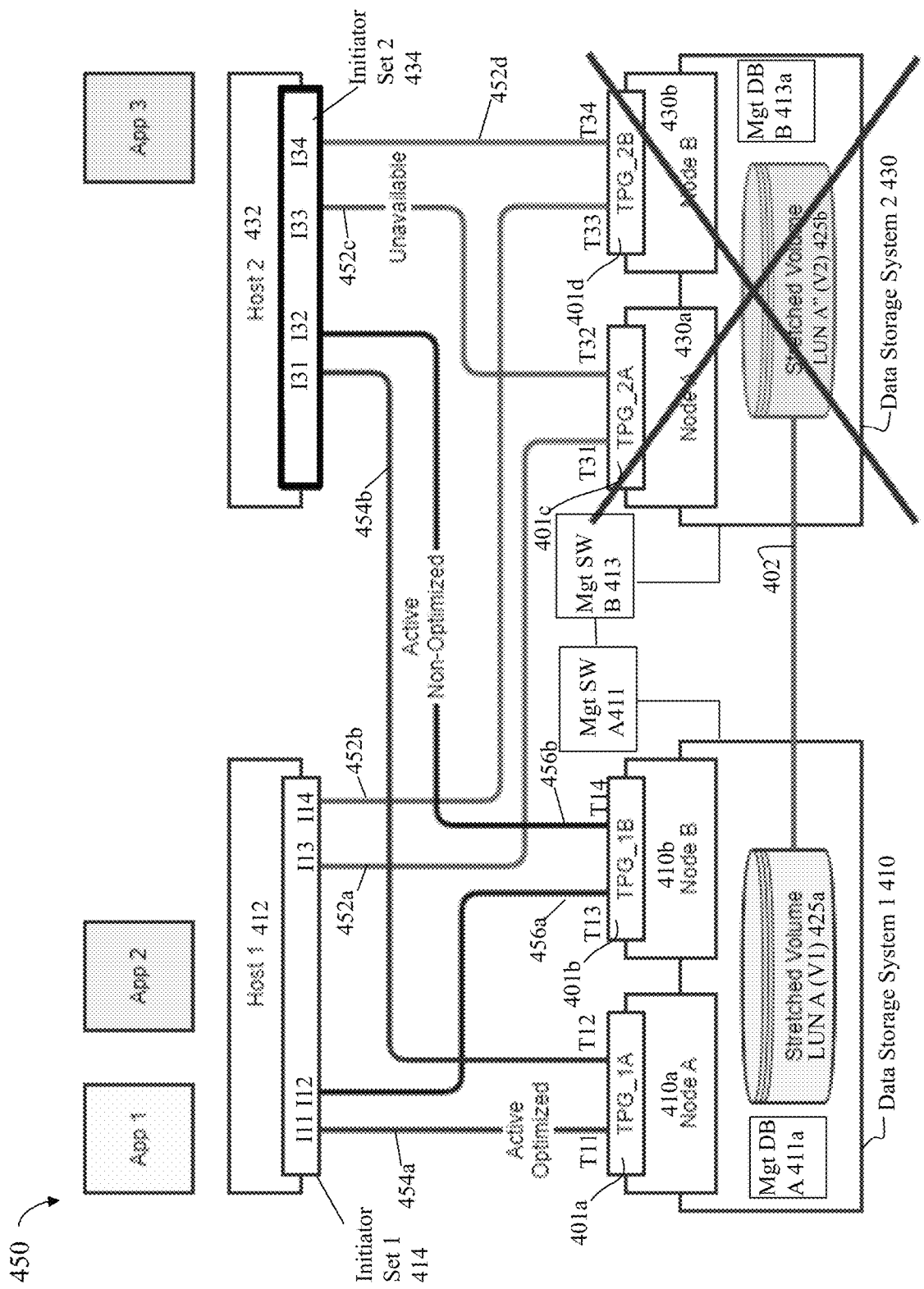

In at least one embodiment in accordance with the techniques herein, processing can y be performed consistent with discussion elsewhere herein where the data storage systems determine the ALUA path states, such as in connection with FIGS. 6, 7A and 7B, and expose or communicate such ALUA path states (also sometimes referred to herein access states) to the hosts. Thus, when the LUN is exposed to a host initiator over multiple paths (e.g., where the same LUN is accessible through multiple different target ports of the data storage system), the data storage systems can vary the associated access state of each such path in order to vary and control the particular ones of the multiple paths over which the host may issue I/Os to the LUN. In particular, processing can be performed by the data storage systems, such as the systems 410, 430 of FIGS. 7A and 7B, to determine which particular paths to the hosts 412, 432 are active optimized and which are active non-optimized at various points in time. The processing can include the data storage systems 410, 430 communicating the path states to the hosts 412, 432 and then also notifying the hosts 412, 432 when there are any changes to the path states, such as in response to a data storage system failure such as illustrated in FIG. 7B. In this manner, the hosts 412, 432 can select paths over which to send I/Os based on the particular ALUA path states or access states for particular volumes or LUNs as determined and communicated by the data storage systems 410, 430, where I/Os are sent by the hosts over those active-optimized paths.

Although FIGS. 7A and 7B illustrate a per path ALUA access state where paths or targets from the same target port group (TPG) can have different access states, consistent with other discussion herein in at least one embodiment, all target ports included in the same target port group (TPG) can have the same ALUA access state. In this case with reference to FIGS. 7A and 7B, a connection from a TPG to a host initiator can more generally represent the ALUA path state with respect to all target ports of that TPG to that particular host initiator. For example, the line or connection 422a having an associated ALUA path state of active optimized between I11 and T11 can denote multiple paths from the host 412 initiator I11 to all target ports of the TPG 1A 401a; and the line or connection 423d having an associated ALUA path state of active non-optimized between I31 and T12 can denote multiple paths from the host 432 initiator I31 to all target ports of the TPG 1A 401a. In a similar manner, each of the remaining lines or connections between an initiator-target pair (also initiator-TPG pair) can denote multiple paths between the initiator and the target ports of a TPG.

In the following paragraphs, the techniques herein may refer to a SCSI based protocol, such as FC or iSCSI. However, the concepts of a metro cluster configuration, stretched volume, and the techniques described in the following paragraphs may also be used in embodiments using other suitable protocols. The host may send a command to the data storage system requesting information about a particular LUN or volume. In response, the data storage system may report information about the volume or LUN. The information reported may include the TPG IDs and target port IDs over which the volume or LUN is exposed. For the volume or LUN exposed over paths between target ports and host initiator ports, the information reported may also identify the particular ALUA path states of such paths. Such reporting may be used by the host, for example, in connection with discovery and other processing so that the host knows the particular ALUA path states and the particular target port IDs to use when sending an I/O to the data storage system. As discussed elsewhere herein, the host may use the ALUA path states communicated in the reporting information to identify and select a path that is active optimized and then send I/Os directed to the volume or LUN over the active optimized path to a particular target port ID.

Consistent with discussion herein such as in connection with FIGS. 5, 7A and 7B, a stretched volume or LUN is configured from a LUN or volume pair (R1, R2), where R1 and R2 are different instances of LUNs or volumes respectively on two data storage systems of the metro cluster. Further, the volumes R1 and R2 are configured to have the same identity and appear to a host as the same volume or LUN. Thus a volume or LUN on a first local data storage system may be characterized as stretched if that volume or LUN also has a matching counterpart remote volume or LUN on the other remote data storage system of the metro cluster pair.

In contrast to the stretched volume or LUN is an unstretched or non-stretched volume or LUN. A volume or LUN may be characterized as an unstretched volume or LUN existing on only one data storage system within the metro cluster pair.

Consistent with other discussion herein, depending on the data storage system implementation, only a single ALUA path within a local data center with respect to a host for a stretched volume can be active optimized such as illustrated in FIG. 7A. In contrast to the foregoing, alternatively, more than a single ALUA path within a local data center for a particular host can be active optimized for the stretched volume. However, in such embodiments consistent with other discussion herein, paths from a host to a remote data storage system and a remote data center for a remote copy of the stretched volume can be active non-optimized in order to make the host prefer to use local paths to the local copy of the stretched volume. It should be noted that while particular figures such as FIG. 7A show just a single active optimized path for simplicity, in most real-life deployments, paths between the host and a data storage system can have an associated access path state at the group level, such as based on a group of target ports as discussed elsewhere herein.

In connection with the data storage systems, or more particularly, the control path and management software of the data storage systems setting and modifying ALUA path states for exposed volumes or LUNs, the control path and management software of such systems can be configured with, and are aware of, the current topology of the metro cluster configuration. For example, the management software such as denoted by the elements 411 and 413 of FIGS. 7A and 7B know which hosts and data storage systems are local and included in the same data center, and which hosts and data storage systems are remote and included in different data centers. In this manner, the management software components 411, 413 respectively of the systems 410, 430 can communicate and cooperate to appropriately set ALUA path states and also ensure that both of the systems 410, 430 report the same information to the hosts 412, 432 for the exposed volumes or LUNs, such as the stretched LUN A configured from the volume pair 425a, 425b.

Consistent with discussion elsewhere herein, a metro cluster configuration in at least one embodiment can be characterized as a configuration with two data storage systems each including a different volume Vi of a volume pair (V1, V2), where each volume of the pair is configured to have the same logical device identity when exposed to a host or other data storage client. Thus, the volume pair can be presented to the host or other client as a single logical device L, sometimes also referred to as a metro volume or device, or a stretched volume or device, accessible over multiple paths to both data storage systems. Although examples provided herein for illustration may reference a metro cluster configuration including two data storage systems, more generally, the metro cluster configuration can include more than two data storage system and more than a pair of volumes such that each of the storage systems includes one of the volumes configured to have the same logical device identity when exposed to the host or other data storage client.

In at least one metro cluster configuration including two data storage systems, each of the two data storage systems, DS1 and DS2, can be in a different data center. A host can be configured with uniform host connectivity or attachment in the metro cluster configuration. With uniform host attachment or connectivity, the host has connectivity to both data storage systems DS1 and DS2 of the metro cluster configuration. In particular with uniform host attachment or connectivity with respect to a stretched volume or logical device L, the host can be configured to have connectivity to both the volumes V1 and V2, the identically configured volumes of the volume pair, located in the two systems DS1, DS2. The host can be located in one of the data centers with DS1, where DS1 can be characterized as local with respect to the host and where the remaining DS2 located in a different data center can be characterized as remote with respect to the host. The volumes V1 and V2 can be configured for synchronous bi-directional or two way remote replication in order to maintain V1 and V2 as data mirrors presented to the host as the single configured logical device L.

In the metro cluster configuration, the data storage systems can be SCSI-based systems operating in accordance with the SCSI standard. In the metro cluster configuration, the hosts and data storage systems can operate in accordance with ALUA (Asymmetrical Logical Unit Access), which is included in the SCSI standard. As discussed above, ALUA specifies a mechanism for asymmetric or symmetric access of a logical device, logical unit or LUN as used herein. ALUA allows the host and/or data storage system to set a LUN's access state with respect to a particular initiator port and the target port. Thus, in accordance with the ALUA standard, various access states (also sometimes referred to herein as ALUA states or path states) can be associated with a path with respect to a particular exposed device, such as a LUN. In particular, the ALUA standard defines such access states including active-optimized (AO), active-non optimized (ANO), as well as others. With respect to a stretched volume, device or LUN, L, first paths between the host to the local DS1 can be configured as AO, and second paths between the host and the remote DS2 can be configured as ANO, such that under normal operating conditions, the host uses the AO paths to the local DS1 for issuing I/Os directed to the stretched LUN L rather than the ANO paths to the remote DS2.

With SCSI protocols, a host can use a command such as the REPORT TARGET PORT GROUP (RTPG) command as part of discovery processing. In particular, initiators of the host can query target ports by sending RTPG commands to all connected target system ports of both the local DS1 and the remote DS2 to discover information including ALUA path states with respect to the stretched LUN L exposed to the host over paths between the target system ports and the host initiators. The host can send a RTPG command requesting information regarding the stretched LUN L over a first path from initiator I1 of the host to the target port T1 of the local DS1. In response, T1 of DS1 can report information regarding ALUA path state information not only for the path I1-T1 but also regarding other paths over which the stretched LUN L is exposed to the host. In this manner, the response from T1 can include ALUA path state information regarding a second path between I1 of the host and the target port T2 of the remote DS2. More generally, queried target ports of DS1 exposing V1 configured as the stretched LUN L also report ALUA path state and other information regarding remote target ports of the remote DS2, where such other remote target ports also expose V2 configured as the stretched LUN L.

Supporting the RTPG command in connection with information reported for ALUA path states for stretched LUNs can require complex coordination and communication between DS1 and DS2 especially since configuring the host access to both data storage systems DS1 and DS2 can typically be performed in a step-wise manner. For example, in order for each of the data storage systems, such as DS1, to report complete information regarding all target ports of DS1 and DS2 exposing the stretched LUN, both DS1 and DS2 can communicate with each other where, for example, DS1 can provide DS2 with its up to date ALUA path state information, and where DS2 can similarly provide DS1 with its up to date ALUA path state information.

A fully populated configuration with respect to uniform host connectivity or access for a stretched LUN in a metro cluster configuration can be characterized as a desired end result or target configuration. With the fully populated configuration, host access to the stretched LUN (e.g., volumes V1 and V2 configured with the same identity of the stretched LUN) is configured on both DS1 and DS2 over a network. However, the fully populated configuration is not completed instantaneously and can typically be completed in multiple steps over a time period. For example, host access can be configured individually on both DS1 and DS2. In this case for example, a user can perform a first part of the configuration to configure host access to V1 on DS1. The first part can provide host connectivity to only DS1 (e.g., connectivity to V1 and thus the stretched LUN on DS1) but not DS2 (e.g., not V2 on DS1). Once the first part is complete but prior to configuring host connectivity to DS2, queried first target ports of DS1 exposing V1 can report ALUA path states to the host regarding the first target ports of DS1 with respect to V1 but not V2 on DS2. Once the first part is complete, a user can perform a second part of the configuration to configure host access to V2 on DS2, wherein both V1 and V2 are configured to have the same identity such as presented to the host as the same stretched LUN L. Once the foregoing first part and the second part of the configuration are complete, queried first target ports of DS1 exposing V1 as the LUN L and also queried second target ports of DS2 exposing V2 as the LUN L should report ALUA path states to the host regarding 1) the first target ports of DS1 with respect to the LUN L and also 2) the second target ports of DS2 with respect to the LUN L. Once the second part of the host access configuration is complete on DS2, ALUA path state information of both DS1 and DS2 needs to be updated to reflect the fully populated configuration. Thus, coordination and communication of ALUA path state information occur between DS1 and DS2 in order to have both systems report ALUA path state information for the fully populated configuration of uniform host attachment in response to RTPG commands regarding the stretched LUN L.

Accordingly, described in the following paragraphs are techniques that can be used in connection with efficiently reporting ALUA path state information for uniform host connectivity regarding stretched LUNs. In at least one embodiment, such reported information regarding ALUA path state information regarding a stretched LUN can be reported by a data storage target port of a data storage system. The reported ALUA path state information can be reported by the target port in response to the target port receiving a command request or query such as in response to the target port receiving a RTPG command from an initiator port of a host. The RTPG command can be issued by the initiator port over a particular path between the initiator port and the target port with respect to a particular LUN, such as a stretched LUN.

In accordance with the techniques of the present disclosure in at least one embodiment, the target configuration for a host can be host uniform connectivity with respect to the stretched LUN L configured from V1 on DS1 and V2 on DS2, where V1 and V2 are configured to have the same identity of "LUN L" and where V1 and V2 are exposed to the host as LUN L over paths from both DS1 and D2. Assume that for the host H1, host connectivity to DS1 is configured first in time prior to D2 with respect to the stretched LUN L. When host access to V1 configured as LUN L is only configured on DS1 but not DS2, the ALUA path state information reported by any target ports of DS1 exposing V1 (configured as the LUN L) can include ALUA path state information for the LUN L for both target ports of DS1 and also target ports of DS2. Put another way, target ports of DS1 can report ALUA path state information regarding the fully populated uniform host connectivity for H1 with respect to LUN L even though such uniform host connectivity has not yet been completed where, for example, the host H1 connectivity with respect to DS2 and LUN L is not yet configured but the host connectivity with respect to DS1 and the LUN L is configured.

In at least one embodiment in accordance with the present disclosure, connectivity for V1 configured as the LUN L on DS1 can be completed prior to configuring V2 as LUN L on DS2. In accordance with the techniques of the present disclosure, when configuring DS1, configuration information regarding the target configuration of a fully populated configuration with uniform host connectivity for H1 with respect to the stretched LUN L can be specified and stored on DS1 such as in a database (DB). In one aspect, the configuration information of the DB specifying the fully populated uniform host attachment for H1 with respect to the stretched LUN L can be characterized, at least in part, as including predetermined configuration information regarding connectivity to DS2 and the stretched LUN L since connectivity can be established with respect to DS1 so that V1 (configured as the stretched LUN L) is exposed over target ports of DS1 to H1, but where there can be no connectivity established with respect to H1, DS2 and the stretched LUN L (e.g., where there is no V2 configured as the LUN L exposed over target ports of DS2 to H1). In this manner, the RTPG command requesting information regarding LUN L can be issued from an initiator I1 of H1 to a target port T1 of DS1. In response, T1 can use the configuration information in the DB of DS1 to report the fully populated host uniform attached for H1 with respect to the stretched LUN L when H1-DS1 connectivity for LUN L has been established but H1-DS2 connectivity for LUN L has not yet been established. Put another way, in response to the foregoing RTPG command regarding LUN L, T1 can use the configuration information in the DB of DS1 to report the fully populated host uniform attached for H1 with respect to the stretched LUN L when the LUN L (e.g., configured from the volume V1 on DS1) is exposed to H1 over target ports of DS1 and when the LUN L is not exposed to H1 over target ports of DS2. Thus though the reported ALUA path state information reported by the queried DS1 target port T1 may not be current regarding one or more other target ports of DS2. In this manner, the host H1 can further perform additional discovery processing and issue one or more RTPG commands regarding the LUN L to the one or more target ports of DS2 to obtain current information regarding LUN L with respect to the one or more target ports of DS2. If connectivity to DS2 for the LUN L and the host H1 is not established, a RTPG to target port T2 of DS2 regarding LUN L can result in the host H1 discovering that the LUN L is currently unmapped or not currently exposed over T2 to H1. In a similar manner, other RTPG commands issued from H1 to other target ports of DS2 also result in obtaining current information regarding LUN L as unmapped or not exposed with respect to such queried target ports of DS2.

In at least one embodiment in accordance with the techniques of the present disclosure, each of DS1 and DS2 can be configured individually and initially provided with the complete fully populated uniform host connectivity configuration as information to be returned in response to a RTPG command received by the particular DS from the host H1 regarding the stretched LUN L once the particular DS has been configured to expose its corresponding one of the volume pair (V1, V2). Once uniform host connectivity of the fully populated configuration for the host H1 to the stretched LUN L has been established for both DS1 and DS2 (e.g., where both V1 of DS1 and V2 of DS2 are exposed to the host H1), DS1 and DS2 can further communicate and coordinate ALUA path state and other information regarding the stretched LUN L. The target state of the fully populated configuration of uniform host connectivity with ALUA path state information can be preconfigured on each data storage system DS1 and DS2 as each such system is individually configured, and where once the stretched LUN L is exposed by a particular one of the data storage systems, such preconfigured information can be reported in response to a RTPG command received by the particular one of the data storage systems without communicating and coordinating with the other data storage system. In this manner, prior to completing and establishing the fully populated configuration on both DS1 and DS2, DS1 can, for example, report the fully populated configuration of uniform host attachment to H1 with respect to the LUN L even when host connectivity for the LUN L has not yet been established between H1 and DS2.

The techniques of the present disclosure can be used to reduce the communication and coordination of ALUA path state information between the data storage systems of the metro cluster such as prior to establishing and completing the fully populated configuration with respect to a host and its associated host uniform connectivity. Additionally, as further discussed below, the techniques of the present disclosure can be characterized as leveraging the concepts of "current" ALUA path state information and an authoritative target port which is queried using a RPTG command in order to ensure that a host obtains complete and accurate path state information regarding a stretched LUN and that particular queried target port. In this manner, the host can discover current, up to date, accurate ALUA path state information regarding paths across multiple data storage systems exposing the stretched LUN so that the host knows which particular paths to use for issuing I/Os directed to the stretched LUN at various points in time prior to completing the fully populated configuration for uniform host access.

The foregoing and other aspects of the techniques of the present disclosure are described in more detail in the following paragraphs.

In the following paragraphs, the techniques of the present disclosure are described in some embodiments in which a particular ALUA path state for a particular LUN is applied at the TPG level of granularity where all target ports in the same TPG have the same ALUA path state. In this case, all target ports in the TPG over which a LUN is exposed acquire the TPG ALUA path state. For example, setting a TPG to active optimized (AO) for an exposed LUN accordingly sets all target ports in the TPG to AO for the exposed LUN. As another example, setting a TPG to active non optimized (ANO) for the exposed LUN accordingly sets all target ports in the TPG to ANO for the exposed LUN.

In the following paragraphs, a stretched volume or LUN is described as being stretched between and among two data storage systems included in a metro cluster configuration as described elsewhere herein, for example, such as in FIGS. 5 and 7A. As discussed above such as in connection with FIG. 7A, the volumes 425a-b can be configured for bi-directional or two way synchronous remote replication in order to synchronize the content of the volumes 425a-b to be mirrors of one another. Additionally the techniques are illustrated in the following paragraphs with non-limiting examples of a metro cluster configuration and a stretched volume configured from two volumes on two data storage systems.

As noted above, with SCSI protocols, host initiators can send RTPG commands to all connected target ports (e.g., of data storage system(s)) to discover ALUA path states for LUNs such as a stretched LUN. As discussed below in more detail such as in connection with the table 505 of FIG. 8A and the table 555 of FIG. 8B, the tables 505 and 555 illustrate information included in RTPG responses, respectively, sent to Host 1 412 and Host 2 432 with respect to 4 TPGs as illustrated in FIG. 7A. These responses of table 505 and table 555 are for an established "fully populated" configuration where uniform host connectivity or host access for both Host 1 412 and Host 2 432 is configured and established correctly on both data storage system (DS1) 410 and also data storage system 2 (DS2) 430.

In practice, establishing or creating such a fully populated configuration cannot be done instantaneously or at once. The configuration of FIG. 7A can denote the established fully populated or desired configuration achieved for hosts 412 and 432 with respect to the stretched LUN A configured from the volume pair (V1 425a, V2 425b). However, the process for creating and establishing the fully populated configuration generally involves multiple configuration steps establishing connectivity between the hosts and the data storage systems. For example, host access can be configured individually for each host with respect to both data storage systems 410 and 430. For example, in a first step, a user can configure the host 412 with access to V1 425a on the data storage system 410. Once this first step is complete, the LUN A 425a is exposed to the host 412 over the TPGs 410a and 410b. Once this first step is complete, only TPGs 410a and 410b should report path states to the host 412 regarding LUN A since there is currently no configured remote access between the host 412 and the remote data storage system 430. Subsequent to the first step, a second step can be performed for the host 412 where a user can configure the host 412 access to V2 425b on the remote data storage system 430. Once the second step has been completed for the host 412 with respect to the stretched LUN A, all 4 TPGs 410a-b and 430a-b should report path states regarding all 4 paths for the stretched LUN A to the host 412.

In at least one embodiment, a fully populated configuration with respect to a stretched LUN for a particular host can be characterized as a configuration where there is uniform host connectivity or attachment for the host. In this manner with established uniform host connectivity for all hosts for a stretched LUN, each host has connectivity to both data storage systems each hosting a volume instance configured as the stretched LUN, and the volume instance configured as the stretched LUN on each data storage system is accessible and exposed to each host over one or more paths.

Figure 8A:
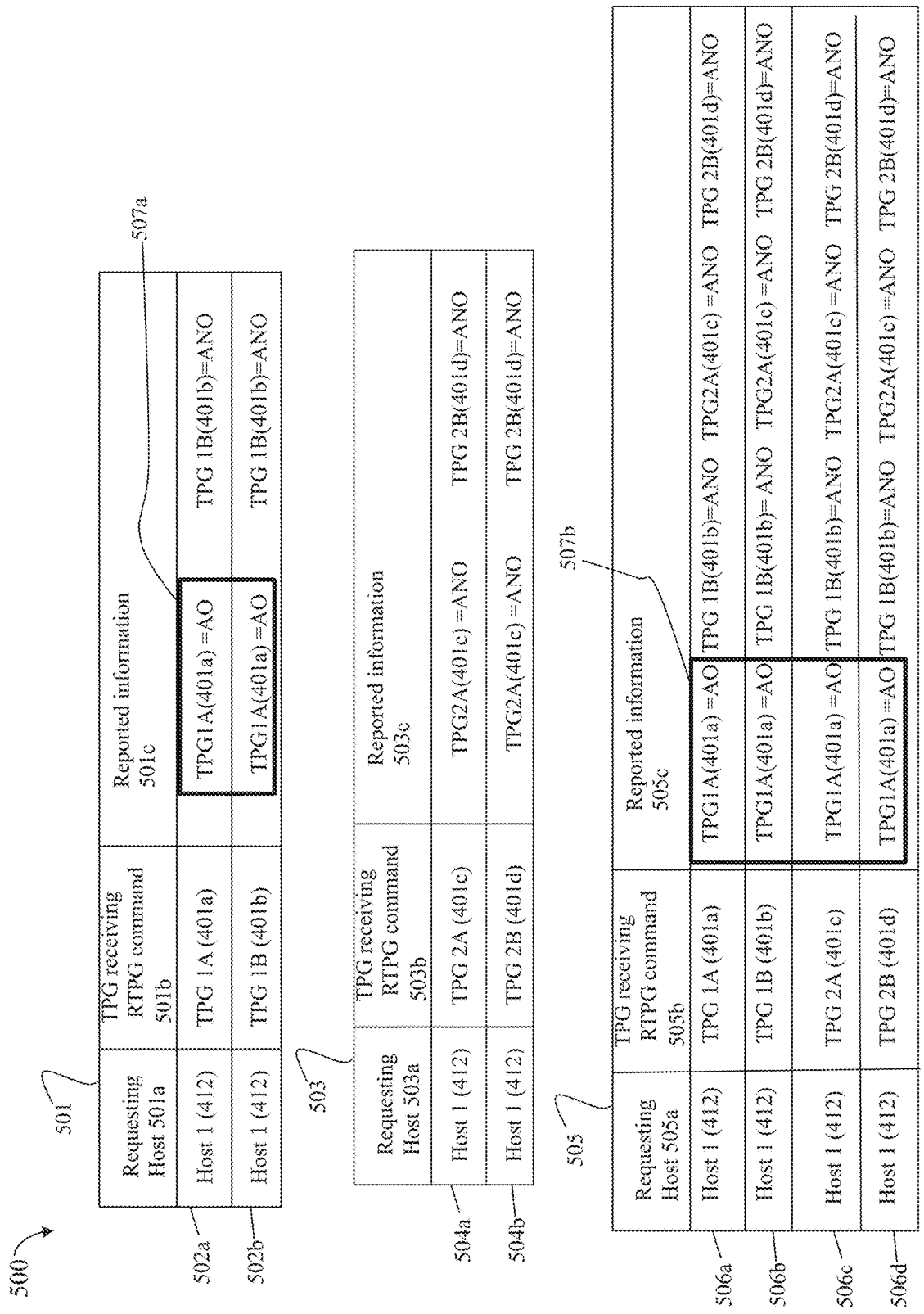
FIGS. 8A and 8B are examples of tables of information that can be reported in at least one implementation not using the techniques of the present disclosure.
Figure 8B:
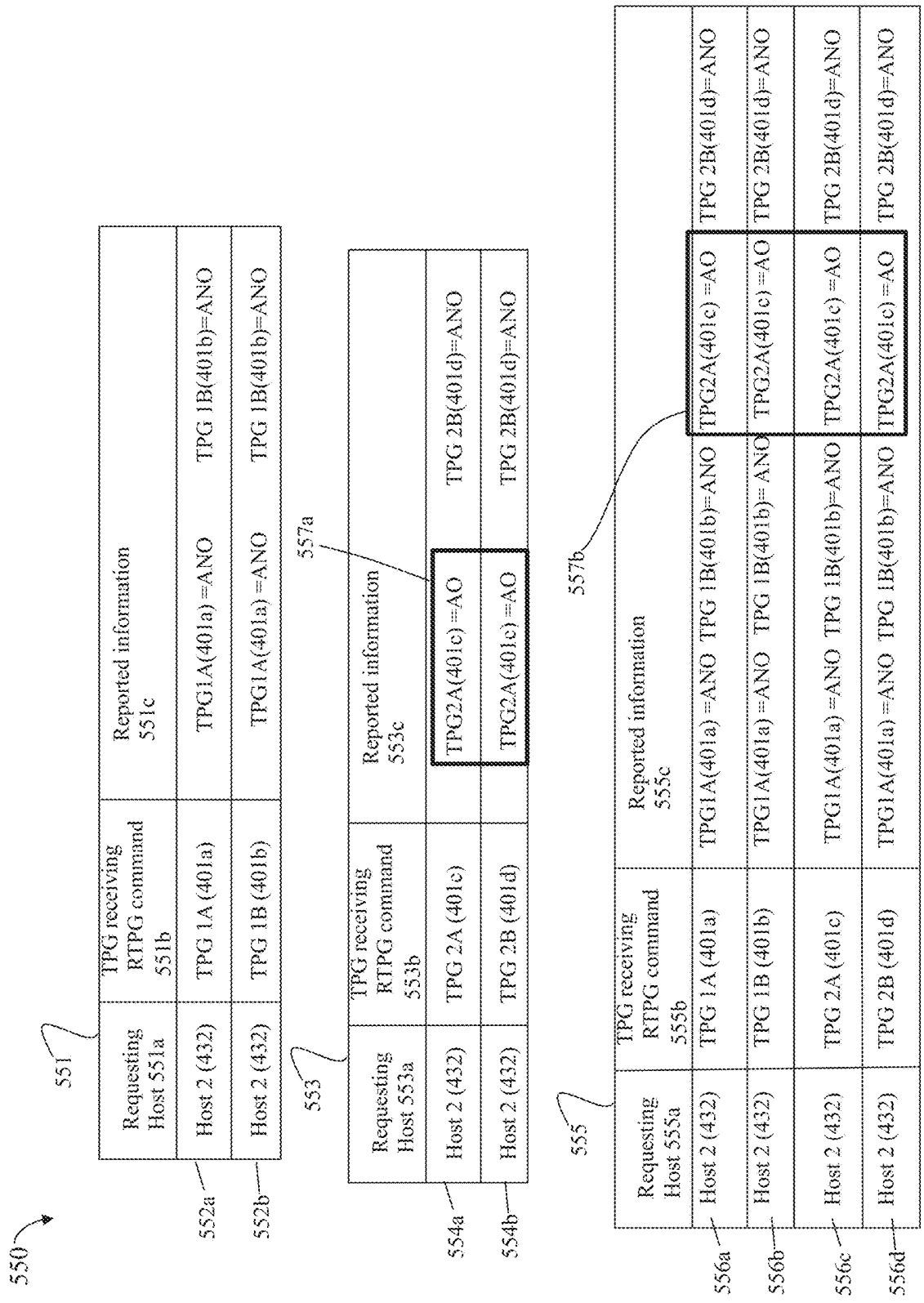

Referring to FIGS. 8A and 8B, shown are tables of information that can be reported, respectively, to the hosts 412 and 432 at various points in time in connection with configuring and establishing a fully populated configuration with uniform host connectivity for the hosts 412, 432 of FIG. 7A without using the techniques of the present disclosure.

In particular, the example 500 of FIG. 8A illustrates tables of information that can be reported to the host 412 with respect to the stretched LUN A at various points in time in connection with configuring and establishing host connectivity to the stretched LUN A (which is configured from the volumes 425a, 425b). In particular, the example 500 illustrates information that can be reported to the host 412 without use of the techniques of the present disclosure in response to various RTPG commands sent target ports of DS1 410 and DS2 430.

The table 501 illustrates information reported to the host 412 when the configuration is in a state Sla, where the LUN A configured as V1 425a on DS1 410 is mapped or exposed to the host 412 by DS1 410, and where there is no established connectivity between the host 412 and DS2 430 for the LUN A. In this case, information about LUN A is only reported regarding the DS 410 and nothing is reported regarding the LUN A from the remote DS2 430 since LUN A is not mapped, exposed or visible to the host 412 over any path from the remote DS2 430.

The table 501 includes the following columns: requesting host 501a, TPG receiving the RTPG command 501b, and reported information 501c. Each row of the table 501 denotes information reported by a particular target port of a TPG for the LUN A in response to any target port of the TPG receiving a RTPG command from an initiator of host 1 412. The row 502a indicates that an initiator from the host 412 (identified in column 501a) sends a RTPG command to a target port of TPG 1A 401a (identified in column 501b), and where in response to the RTPG command, the TPG1A 401a reports information including that as specified in the reported information (501c). The row 502a denotes that the reported information (501c) indicates paths from target ports of TPG1A (401a) are AO and paths from target ports TPG1B (401b) are ANO.

The row 502b indicates that an initiator from the host 412 (identified in column 501a) sends a RTPG command to a target port of TPG 1B 401b (identified in column 501b), and where in response to the RTPG command, the TPG1B 401b reports information including that as specified in the reported information (501c). The row 502b denotes that the reported information (501c) indicates paths from target ports of TPG1B (401a) are AO and paths from target ports TPG1B (401b) are ANO. Thus, in the state Sla, target ports of TPG1A 401a and TPG1B 401b both report the same information. When in the state Sla, there is no path information reported to the host 1 412 regarding LUN A on DS2 430 because the LUN A is not currently exposed over any path from DS2 430 to the host. The element 507a denotes those paths from the TPG1A to the host 412 are reported as AO.

The table 503 illustrates information reported to target ports of the host 412 when the system is in a state S1b, where the LUN A configured as V2 425b on DS2 430 is mapped or exposed to the host 412 by DS2 430, and where there is no established connectivity between the host 412 and DS1 410 for the LUN A. In this case with the state S1b, information about LUN A is only reported regarding the DS2 430 and nothing is reported regarding the LUN A from the DS1 410 since LUN A is not mapped, exposed or visible to the host 412 over any path from the DS1 410.

The table 503 includes the following columns: requesting host 503a, TPG receiving the RTPG command 503b, and reported information 503c. Each row of the table 503 denotes information reported by a particular target port of a TPG for the LUN A in response to any target port of the TPG receiving a RTPG command from an initiator of host 1 412. The row 504*a* indicates that an initiator from the host 412 (identified in column 501*a*) sends a RTPG command to a target port of TPG 2A 401*c* (identified in column 501*b*), and where in response to the RTPG command, the TPG2A 401*c* reports information including that as specified in the reported information (501*c*). The row 504*a* denotes that the reported information (503*c*) indicates paths from target ports of TPG2A (401*c*) are ANO and paths from target ports TPG2B (401*d*) are ANO. The row 504*b* indicates that an initiator from the host 412 (identified in column 503*a*) sends a RTPG command to a target port of TPG 2B 401*c* (identified in column 503*b*), and where in response to the RTPG command, the TPG2B 401*d* reports information including that as specified in the reported information (503*c*). The row 504*b* denotes that the reported information (503*c*) indicates paths from target ports of TPG2B (401*d*) are ANO and paths from target ports TPG1A (401*c*) are ANO. Thus, in the state S1*b*, target ports of TPG2A 401*c* and TPG2B 401*d* both report the same information. With the state S1*b*, there is no path information reported to the host 1 412 regarding LUN A on DS1 410 because the LUN A is not currently exposed over any path from DS1 410 to the host.

The foregoing states S1a and S1*b* can denote alternative states with respect to established connectivity for host 412 depending on whether connectivity is first configured and established between the host 412 and the DS 410 (state S1a), or whether first configured and established between the host 412 and the DS 430 (state S1*b*). If the configuration is in the state S1a, a next part of the configuration processing can be performed where connectivity can then be established between the host 412 and the DS 430 to expose the stretched LUN A to the host 412 over paths from DS 430. When in the state S1a and the next part of the configuration processing is performed to establish the connectivity between the host 412 and the DS 430 for the stretched LUN A, the configuration can be characterized as transitioning from the state S1a to a state S2 denoting the established fully populated uniform host connectivity for the host 412.

If the configuration is in the state S1*b*, a next part of the configuration processing can be performed where connectivity can then be established between the host 412 and the DS 410 to expose the stretched LUN A to the host 412 over paths from DS 410. When in the state S1*b* and the next part of the configuration processing is performed to establish the connectivity between the host 412 and the DS 410 for the stretched LUN A, the configuration can be characterized as transitioning from the state S1*b* to the state S2 denoting the established fully populated uniform host connectivity for the host 412.

The table 505 illustrates information reported to the host 412 when the configuration is in the state S2 where the LUN A configured as V1 425*a* on DS1 410 is mapped or exposed to the host 412 by DS1 410, and also where the LUN A configured as V2 425*b* is mapped or exposed to the host 412 by DS 430. Generally, the state S2 denotes the established fully populated uniform host connectivity for the host 412 with respect to the stretched LUN A. As noted above, the state S2 can result subsequent to performing processing which establishes the state S1a denoted by the table 501. Additionally, the state S2 can result subsequent to performing processing that establishes the state S1*b* denoted by the table 503. In this state S2, information about LUN A is reported regarding the DS 410 and the DS2 430 since LUN A is mapped, exposed or visible to the host 412 over paths from both DS1 410 and DS2 430.

The table 505 includes the following columns: requesting host 505*a*, TPG receiving the RTPG command 505*b*, and reported information 505*c*. Each row of the table 505 denotes information reported by a particular target port of a TPG for the LUN A in response to any target port of the TPG receiving a RTPG command from an initiator of host 1 412. The row 506*a* indicates that an initiator from the host 412 (identified in column 505*a*) sends a RTPG command to a target port of TPG 1A 401*a* (identified in column 505*b*), and where in response to the RTPG command, the TPG1A 401*a* reports information including that as specified in the reported information (505*c*). The row 506*a* denotes that the reported information (505*c*) indicates paths from target ports of TPG1A (401*a*) are AO and paths from all of the target ports TPG1B (401*b*), TPG2A (401*c*) and TPG2B (401*d*) are ANO.

The row 506*b* indicates that an initiator from the host 412 (identified in column 505*a*) sends a RTPG command to a target port of TPG 1B 401*b* (identified in column 505*b*), and where in response to the RTPG command, the TPG1B 401*b* reports information including that as specified in the reported information (505*c*). The row 506*b* denotes that the reported information (505*c*) indicates paths from target ports of TPG1A (401*a*) are AO and paths from all of the target ports TPG1B (401*b*), TPG2A (401*c*) and TPG2B (401*d*) are ANO.

The row 506*c* indicates that an initiator from the host 412 (identified in column 505*a*) sends a RTPG command to a target port of TPG 2A 401*c* (identified in column 505*b*), and where in response to the RTPG command, the TPG2A 401*c* reports information including that as specified in the reported information (505*c*). The row 506*c* denotes that the reported information (505*c*) indicates paths from target ports of TPG1A (401*a*) are AO and paths from all of the target ports TPG1B (401*b*), TPG2A (401*c*) and TPG2B (401*d*) are ANO.

The row 506*d* indicates that an initiator from the host 412 (identified in column 505*a*) sends a RTPG command to a target port of TPG 2B 401*d* (identified in column 505*b*), and where in response to the RTPG command, the TPG2B 401*d* reports information including that as specified in the reported information (505*c*). The row 506*d* denotes that the reported information (505*c*) indicates paths from target ports of TPG1A (401*a*) are AO and paths from all of the target ports TPG1B (401*b*), TPG2A (401*c*) and TPG2B (401*d*) are ANO.

The element 507*b* denotes those paths from the TPG1A to the host 412 are reported as AO.

Referring to FIG. 8B, shown is an example 550 of tables of information that can be reported to the host 432 with respect to the stretched LUN A at various points in time while configuring the stretched LUN A from the volumes 425*a*, 425*b*. In particular, the example 550 illustrates information that can be reported to the host 432 without use of the techniques of the present disclosure in response to various RTPG commands sent target ports of DS1 410 and DS2 430.

The table 551 illustrates information reported to the host 432 when the configuration is in a state S3*a*, where the LUN A configured as V1 425*a* on DS1 410 is mapped or exposed to the host 432 by DS1 410, and where there is no established connectivity between the host 432 and DS2 430 for the LUN A. In this case, information about LUN A is only reported regarding the DS 410 and nothing is reported regarding the LUN A from the remote DS2 430 since LUN A is not mapped, exposed or visible to the host 432 over any path from the remote DS2 430.

The table 551 includes the following columns: requesting host 551a, TPG receiving the RTPG command 551b, and reported information 551c. Each row of the table 551 denotes information reported by a particular target port of a TPG for the LUN A in response to any target port of the TPG receiving a RTPG command from an initiator of host 432. The row 552a indicates that an initiator from the host 432 (identified in column 551a) sends a RTPG command to a target port of TPG 1A 401a (identified in column 551b), and where in response to the RTPG command, the TPG1A 401a reports information including that as specified in the reported information (551c). The row 552a denotes that the reported information (551c) indicates paths from target ports of TPG1A (401a) are ANO and paths from target ports TPG1B (401b) are ANO. The row 552b indicates that an initiator from the host 432 (identified in column 551a) sends a RTPG command to a target port of TPG 1B 401b (identified in column 551b), and where in response to the RTPG command, the TPG1B 401b reports information including that as specified in the reported information (551c). The row 552b denotes that the reported information (551c) indicates paths from target ports of TPG1B (401a) are ANO and paths from target ports TPG1B (401b) are ANO. Thus, in the state S1b, target ports of TPG1A 401a and TPG1B 401b both report the same information. When in the state S1b, there is no path information reported to the host 432 regarding LUN A on DS2 430 because the LUN A is not currently exposed over any path from DS2 430 to the host 432.

The table 553 illustrates information reported to target ports of the host 412 when the system is in a state S3b, where the LUN A configured as V2 425b on DS2 430 is mapped or exposed to the host 432 by DS2 430, and where there is no established connectivity between the host 432 and DS1 410 for the LUN A. In this case with the state S3b, information about LUN A is only reported regarding the DS2 430 and nothing is reported regarding the LUN A from the DS1 410 since LUN A is not mapped, exposed or visible to the host 432 over any path from the DS1 410.

The table 553 includes the following columns: requesting host 553a, TPG receiving the RTPG command 553b, and reported information 553c. Each row of the table 553 denotes information reported by a particular target port of a TPG for the LUN A in response to any target port of the TPG receiving a RTPG command from an initiator of host 432. The row 554a indicates that an initiator from the host 432 (identified in column 551a) sends a RTPG command to a target port of TPG 2A 401c (identified in column 551b), and where in response to the RTPG command, the TPG2A 401c reports information including that as specified in the reported information (551c). The row 554a denotes that the reported information (553c) indicates paths from target ports of TPG2A (401c) are AO and paths from target ports TPG2B (401d) are ANO. The row 554b indicates that an initiator from the host 432 (identified in column 553a) sends a RTPG command to a target port of TPG 2B 401c (identified in column 553b), and where in response to the RTPG command, the TPG2B 401d reports information including that as specified in the reported information (553c). The row 554b denotes that the reported information (553c) indicates paths from target ports of TPG2B (401d) are ANO and paths from target ports TPG2A (401c) are AO. Thus, in the state S2b, the target ports of TPG2A 401c and TPG2B 401d both report the same information. With the state S2b, there is no path information reported to the host 432 regarding LUN A on DS1 410 because the LUN A is not currently exposed over any path from DS1 410 to the host. The element 557a denotes those paths from the TPG2A to the host 432 are reported as AO.

The foregoing states S3a and S3b can denote alternative states with respect to established connectivity for the host 432 depending on whether connectivity is first configured and established between the host 432 and the DS 410 (state S3a), or whether first configured and established between the host 432 and the DS 430 (state S3b). If the configuration is in the state S3a, a next part of the configuration processing can be performed where connectivity can then be established between the host 432 and the DS 430 to expose the stretched LUN A to the host 432 over paths from DS 430. When in the state S3a and the next part of the configuration processing is performed to establish the connectivity between the host 432 and the DS 430 for the stretched LUN A, the configuration can be characterized as transitioning from the state S3a to a state S4 denoting the established fully populated uniform host connectivity for the host 432.

If the configuration is in the state S3b, a next part of the configuration processing can be performed where connectivity can then be established between the host 432 and the DS 410 to expose the stretched LUN A to the host 432 over paths from DS 410. When in the state S3b and the next part of the configuration processing is performed to establish the connectivity between the host 432 and the DS 410 for the stretched LUN A, the configuration can be characterized as transitioning from the state S3b to the state S4 denoting the established fully populated uniform host connectivity for the host 432.

The table 555 illustrates information reported to the host 432 when the configuration is in the state S4 where the LUN A configured as V1 425a on DS1 410 is mapped or exposed to the host 432 by DS1 410, and also where the LUN A configured as V2 425b is mapped or exposed to the host 432 by DS 430. Generally, the state S4 denotes the established fully populated uniform host connectivity for the host 432 with respect to the stretched LUN A. The state S4 can result subsequent to performing processing which establishes the state S3a denoted by the table 551. Additionally, the state S4 can result subsequent to performing processing to establish the state S3b denoted by the table 553. In this state S4, information about LUN A is reported as denoted by the table 555 regarding the DS 410 and the DS2 430 since LUN A is mapped, exposed or visible to the host 432 over paths from both DS1 410 and DS2 430.

The table 555 includes the following columns: requesting host 555a, TPG receiving the RTPG command 555b, and reported information 555c. Each row of the table 555 denotes information reported by a particular target port of a TPG for the LUN A in response to any target port of the TPG receiving a RTPG command from an initiator of host 432. The row 556a indicates that an initiator from the host 432 (identified in column 555a) sends a RTPG command to a target port of TPG 1A 401a (identified in column 555b), and where in response to the RTPG command, the TPG1A 401a reports information including that as specified in the reported information (555c). The row 556a denotes that the reported information (555c) indicates paths from target ports of TPG2A (401c) are AO and paths from all of the target ports TPG1B (401b), TPG2B (401d) and TPG1A (401a) are ANO.

The row 556b indicates that an initiator from the host 432 (identified in column 555a) sends a RTPG command to a target port of TPG 1B 401b (identified in column 555b), and where in response to the RTPG command, the TPG1B 401b reports information including that as specified in the reported information (555c). The row 556b denotes that the reported information (555c) indicates paths from target ports of TPG2A (401c) are AO and paths from all of the target ports TPG1B (401b), TPG2B (401d) and TPG1A (401a) are ANO.

The row 556c indicates that an initiator from the host 432 (identified in column 555b) sends a RTPG command to a target port of TPG 2A 401c (identified in column 555b), and where in response to the RTPG command, the TPG2A 401c reports information including that as specified in the reported information (555c). The row 556c denotes that the reported information (555c) indicates paths from target ports of TPG2A (401c) are AO and paths from all of the target ports TPG1B (401b), TPG2B (401d) and TPG1A (401a) are ANO.

The row 556d indicates that an initiator from the host 432 (identified in column 555b) sends a RTPG command to a target port of TPG 2B 401d (identified in column 555b), and where in response to the RTPG command, the TPG2B 401d reports information including that as specified in the reported information (555c). The row 556d denotes that the reported information (555c) indicates paths from target ports of TPG2A (401c) are AO and paths from all of the target ports TPG1B (401b), TPG2B (401d) and TPG1A (401a) are ANO.

The element 507b denotes those paths from the TPG1A to the host 412 are reported as AO.

Consistent with the above discussion such as regarding FIGS. 8A and 8B, complex coordination and communication between the systems 410 and 430 can be required in order to update the ALUA path state information as reported by both data storage systems 410, 430 as a result of performing processing to establish uniform host connectivity for all hosts with respect to a stretched LUN.

In at least one embodiment in accordance with the techniques of the present disclosure, the concept of "current" ALUA path information and an authoritative target port can be leveraged to simplify the configuration information for stretched LUN uniform host attachment, where such configuration information can be using in connection with reporting by the RTPG command at various points in time while establishing the uniform host attachment to a stretched LUN across multiple data storage systems.

Generally, a RTPG command is issued from a host to a data storage system over a particular path with respect to a particular LUN. The path can be defined as an I-T connection where I denotes an initiator of the host and T denotes a target port of a data storage system. In response, the queried or reporting DS (data storage system) target port T reports information regarding the particular LUN with respect to all paths or target ports over which the particular LUN is exposed. For example, assume a RTPG command is issued over the path I11-T11 to the DS 410 with respect to the stretched LUN A. In response the target port T11 reports information regarding all paths, and thus all target ports on both the systems 410 and 430 over which the stretched LUN is exposed. In this case, both the volumes 425a and 425 are configured to have the same LUN identity of "A" and the target port T11 reports information to the host (I11) with respect to the stretched LUN A configured as the volumes 425a and 425b exposed over the targets ports of both the data storage systems 410 and 430. Thus, T11 reports information regarding the stretched LUN A (configured as the two identical volumes 425a-b) as exposed over all the target ports of TPGs 401a-d, across both the data storage systems 410 and 430.

The particular DS target port, such as T11, returns or reports the information regarding the stretched LUN A with respect to itself T11 as well as other information regarding the stretched LUN A for the other DS target ports. The information which T11 reports about itself can be characterized as the up to date or "current" information regarding T11. Although T11 can report ALUA path state and other information regarding other DS target ports, such other information regarding the other DS target ports may not be current or the most up to date information. T11 can be characterized as the authoritative DS target port with respect to reported information about T11. Put another way, even though another queried DS target port such as T14 or T34 can return information about T11 with respect to the stretched LUN, information which T11 reports about itself can be characterized as the current or up to date information regarding T11. In this manner, a first RPTG can be issued to T11 regarding the stretched LUN A where T11 reports first ALUA path state information regarding LUN A exposed over T11. A second RTPG can be issued to T14 regarding the stretched LUN A where T13 reports second ALUA path state information regarding LUN A exposed over T11. If there are differences between the first and second ALUA path state information regarding the LUN A exposed over T11, the first ALUA path state information (as returned by T11) can be used as the current or most up to date information regarding the ALUA path state of LUN A with respect to T11 since T11 is the authority with respect to the current information regarding itself.

The SCSI Primary Command Specification that defines asymmetric logical unit access, or ALUA path state, also introduces the concept of "current" information as noted above. ALUA path state returned for a DS target port by RTPG invoked through that same port shall be used by the host. Information returned through a first DS target port regarding other DS target ports may be not current and the host should use the current information regarding the other DS target ports as retrieved by directly querying each of the other DS target ports by sending an RTPG command to those other DS target ports. In this manner, the host can issue a RTPG to each target port Tx to obtain the current information, including the current ALUA path state information for a stretched LUN, with respect to the queried (or reporting) target port Tx.

To further illustrate, reference is made to FIG. 7A where the host 412 can perform discovery processing. As part of discovery processing, the host 412 issue 4 RTPG commands with respect to the stretched LUN A over each of the following 4 paths: I11-T11 422a; I12-T13 423a; I13-T31 423b; and I14-T33 423c. (A single RTPG command is issued over each of the foregoing 4 paths.) In response to the RTPG command issued over the path 422a to T11, T11 can return a first set of information regarding the ALUA path state of LUN A respect to all 4 paths where the first set of information can indicate that the path 422a is AO. In response to the RTPG command issued over the path 423a to T13, T13 can return a second set of information regarding the ALUA path state of LUN A respect to all 4 paths where the second set of information can indicate that the path 422a is AO. In response to the RTPG command issued over the path 423b to T31, T31 can return a third set of information regarding the ALUA path state of LUN A respect to all 4 paths where the third set of information can indicate that the path 422a is ANO. In response to the RTPG command issued over the path 423c to T33, T33 can return a fourth set of information regarding the ALUA path state of LUN A respect to all 4 paths where the fourth set of information can indicate that the path 422a is ANO.

In the foregoing example, the host 412 receives the foregoing 4 sets of information in response to the 4 RTPG commands and determines there is an inconsistency, conflict or difference with respect to the ALUA path state for the stretched LUN A regarding the path 422a, and thus regarding T11. The inconsistency is between the first and second sets of returned information, which both indicate the path 422a is AO, and the third and fourth sets of returned information, which both indicate the path 422 is AO regarding the ALUA path state for the path 422a and thus regarding T11. In particular the third and fourth sets of information indicate that the path 422a and thus T11 has an associated path state of ANO; and the first and second sets of information indicate that the path 422a and thus T11 has an associated path state of AO. T11 is the authority or is authoritative regarding current information of the first set reported regarding T11 and thus is the authority regarding the current ALUA path state of LUN A exposed over T11 and the path 422a. In this case, the host can resolve the inconsistency or conflict by using the ALUA path state of AO of the first set of information as reported by T11, the authority, regarding information reported by T11 regarding T11.

The techniques of the present disclosure can be used to reduce the communication and coordination of ALUA path state information between the data storage systems of the metro cluster such as prior to establishing and completing the fully populated configuration with respect to a host and its associated host uniform connectivity. Additionally, as further discussed herein, the techniques of the present disclosure can leverage the concepts of "current" ALUA path state information and the authoritative target port which is queried using a RPTG command in order to ensure that a host obtains complete and accurate path state information regarding a stretched LUN. In this manner, the host can discover current, up to date, accurate ALUA path state information regarding paths across multiple data storage systems exposing the stretched LUN so that the host knows which particular paths to use for issuing I/Os directed to the stretched LUN at various points in time prior to completing the fully populated configuration for uniform host access.

In at least one embodiment, each data storage system can be individually preconfigured with the fully populated configuration information of uniform host connectivity for a stretched LUN even though such connectivity to the host is not actually established across both data storage systems. Put another way, the fully populated configuration of uniform host connectivity can denote the expected target or end result state and configuration established so that the fully populated configuration information of host connectivity can also be characterized as predetermined or expected, even though such connectivity may not yet be established. To illustrate reference is made to FIG. 7A, where a first data storage system DS1 410 can be configured for host connectivity for the host 412 regarding the stretched LUN A. Additionally as part of configuring DS 410, DS 410 configuration information, which can be stored on DS 410 (such as in the Mgt. DB A 411a) and used in reporting information for the RTPG command, can be updated and preconfigured to include the fully populated configuration information of uniform host connectivity for the host 412 to report ALUA state information to the host 412. The foregoing updating of the configuration information of DS 410 can be characterized as preconfiguration information, at least in part, because such connectivity to the host 412 with respect to the stretched LUN A may not actually be established across both data storage systems. Rather, for example, the connectivity for the LUN A may only be established between DS410 and the host 412, but not DS 430 and the host 412. In other words, the LUN A may be only exposed to the host 412 over paths from DS 410 but not DS 430, yet DS 410 can report ALUA state information in accordance with the preconfigured fully populated configuration information of uniform host connectivity as stored on the DS410 configuration information.

Additionally, the host 412 can query the target ports of both data storage systems 410, 430 by issuing a RTPG command to each of the target ports regarding the stretched LUN A. In response, each target port which currently exposes a volume configured as the stretched LUN A can report information, including ALUA state information, regarding the stretched LUN A. Each queried target port of DS 410 exposing the stretched LUN A can report ALUA state information in accordance with the preconfigured fully populated configuration information of uniform host connectivity as stored on the DS 410 configuration information. In contrast, each queried target port of DS 430 which may currently not expose the stretched LUN A (since such connectivity has not yet been established) can report no path information and thus no path state information for the stretched LUN A when there are no paths established between the host 412 and the DS 430 over which the stretched LUN A is exposed to the host. Each target port can be considered as authoritative regarding "current" ALUA state information it reports regarding its own ALUA state. Thus, even though reported ALUA path state information received from target ports of the DS 410 can be inaccurate or inconsistent with respect to ALUA path state information reported regarding the stretched LUN A and DS 430, the host 412 can further discover and use the "current" correct information regarding the up to date ALUA path states from the authoritative target ports of the DS 430. In this manner, each data storage system can be preconfigured with the fully populated uniform host connectivity information for a stretched LUN so that each data storage system can have the complete fully populated configuration for the stretched LUN without requiring communication and coordination with the other data storage system. In this manner, providing each data storage system with the fully populated configuration information can be performed when configuring that particular data storage system without communicating with the other data storage system. A host can obtain the current, up to date, accurate ALUA path state information for each particular path as reported by the target port of the particular path.

Figure 9A:
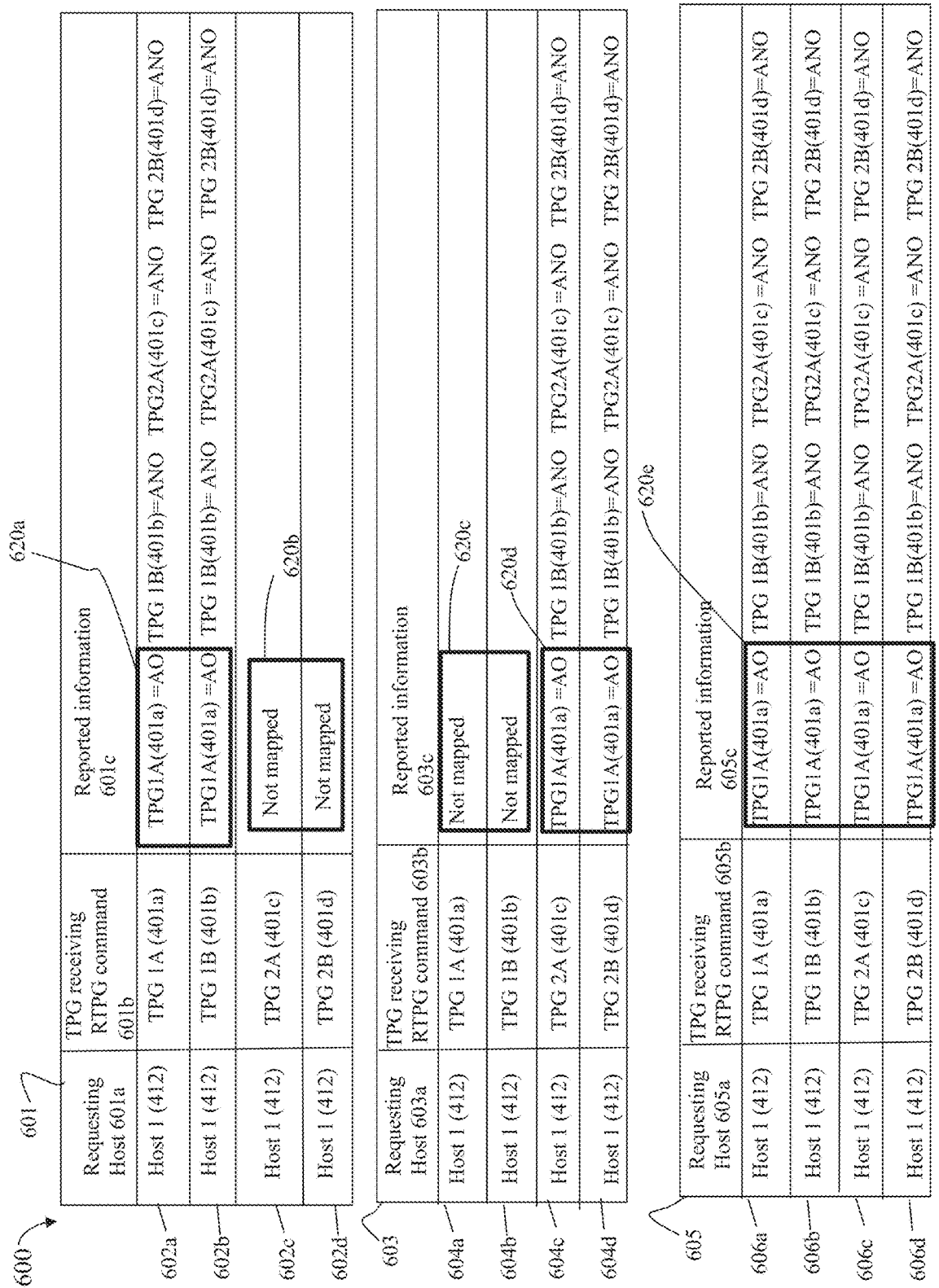
Figure 9B:
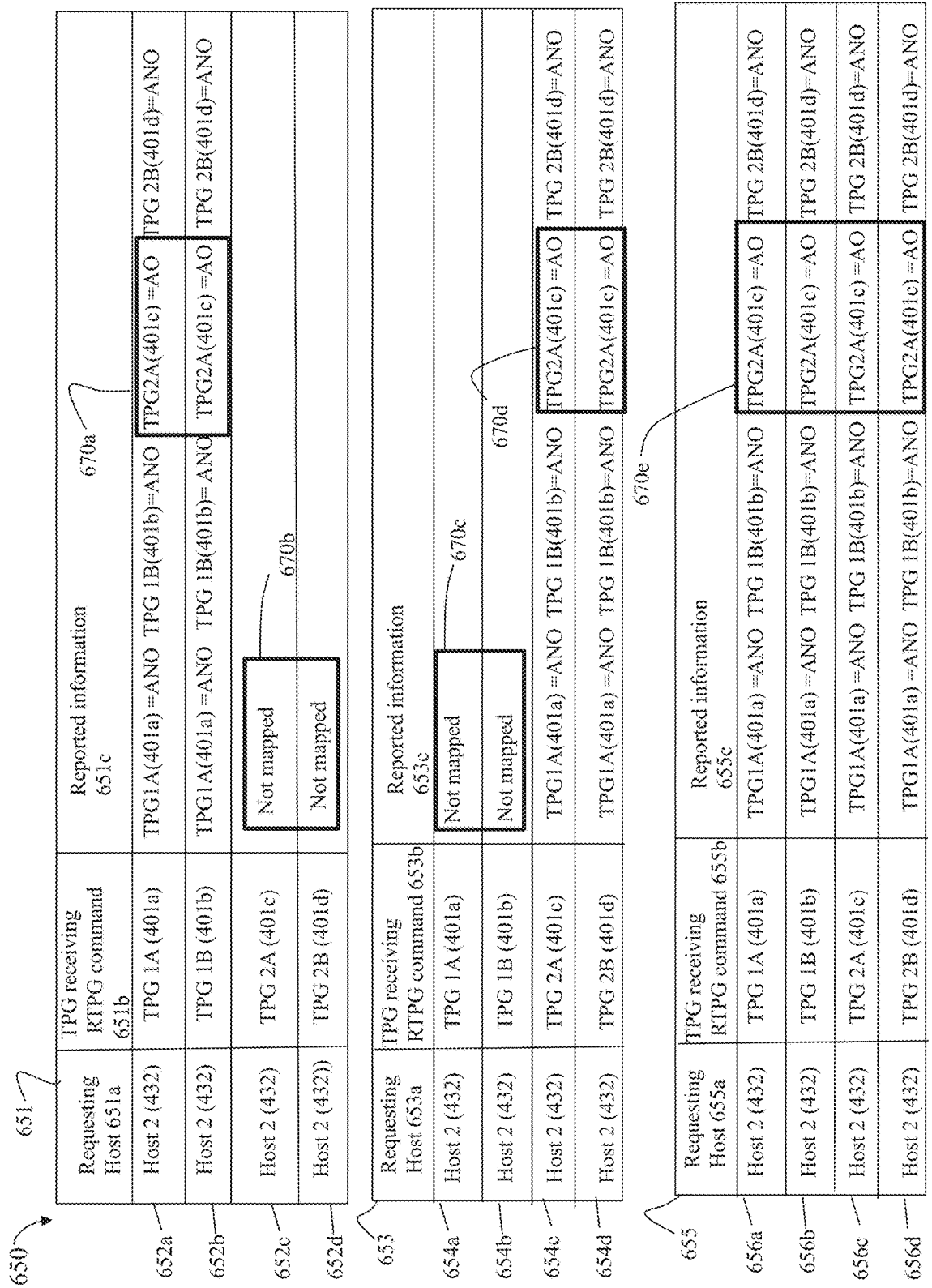

Referring to FIGS. 9A and 9B, shown are tables of information that can be reported, respectively, to the hosts 412 and 432 at various points in time in connection with configuring and establishing a fully populated configuration with uniform host connectivity for the hosts 412, 432 in at least one embodiment in accordance with the techniques of the present disclosure.

The example 600 of FIG. 9A illustrates tables of information that can be reported to the host 412 with respect to the stretched LUN A (configured from volumes 425a-b) at various points in time in connection with configuring and establishing connectivity between the host 412 and the systems 410, 430. In particular, the example 600 illustrates information that can be reported to the host 412 in accordance with the techniques of the present disclosure in response to various RTPG commands sent to the target ports of DS1 410 and DS2 430.

The table 601 illustrates information reported to the host 412 when the configuration is in the state S1a, where the LUN A configured as V1 425a on DS1 410 is mapped or exposed to the host 412 by DS1 410, and where there is no established connectivity between the host 412 and DS2 430 for the LUN A. In this case in accordance with the techniques of the present disclosure, DS 410 can be preconfigured to report the fully populated uniform host configuration for the host 412 even though host 412 access to the LUN A is not yet configured and established on DS2 430. In other words, the information in the table 601 can be reported when the LUN A configured as V1 425a on DS410 is exposed to the host 412, and where LUN A is not exposed to the host 412 over any path between the host 412 and the DS 430. As illustrated in the table 601, target ports of DS 410 can report ALUA path state information in accordance with the fully populated uniform host configuration of the host 412 with respect to the LUN A across the systems 410, 430 even though the LUN A is not exposed to the host 412 over any path from the DS 430.

The table 601 includes the following columns: requesting host 601a, TPG receiving the RTPG command 601b, and reported information 601c. Each row of the table 601 denotes information reported by a particular target port of a TPG for the LUN A in response to any target port of the TPG receiving a RTPG command from an initiator of host 1 412. The row 602a indicates that an initiator from the host 412 (identified in column 601a) sends a RTPG command to a target port of TPG 1A 401a (identified in column 601b), and where in response to the RTPG command, the TPG1A 401a reports information including that as specified in the reported information (601c). The row 602a denotes that the reported information (601c) indicates paths from target ports of TPG1A (401a) are AO, and that paths from the target ports TPG1B (401b), TPG2A (401c) and TPG2B (401d) are ANO. The row 602b indicates that an initiator from the host 412 (identified in column 601a) sends a RTPG command to a target port of TPG 1B 401b (identified in column 601b), and where in response to the RTPG command, the TPG1B 401b reports information including that as specified in the reported information (601c). The row 602b denotes that the reported information (601c) indicates paths from target ports of TPG1B (401a) are AO, and that paths from the target ports TPG1B (401b), TPG2A (401c) and TPG2B (401d) are ANO. Thus, in the state S1a, target ports of TPG1A 401a and TPG1B 401b both report the same fully populated configuration information for the uniform host connectivity configuration for the stretched LUN A.

However, when in the state S1a, the path state information reported by TPGs 401a-b of DS 410 regarding the TPGs 401c-d of DS 430 is not current. The host 412 can use current information retrieved from the target ports of TPGs 403c-d regarding the stretched LUN. In particular, the host 412 can use current information retrieved from the TPG 403c to determine information, such as the ALUA path state information, regarding the stretched LUN A and the target ports of TPG 403c; and the host 412 can use current information retrieved from the TPG 403d to determine information, such as the ALUA path state information, regarding the stretched LUN A and the target ports of TPG 403d. For example, the host 412 can issue a RTPG command regarding the stretched LUN A to target ports of the TPG 403c to determine the current, correct, up to date ALUA path state information regarding the stretched LUN A and the target ports of TPG 403c; and the host 412 can issue a RTPG command regarding the stretched LUN A to target ports of the TPG 403d to determine the current, correct, up to date ALUA path state information regarding the stretched LUN A and the target ports of TPG 403d. In this example with the state S1a, the host 412 can discover, such as using the RTPG and/or other suitable command(s), that the stretched LUN A is not mapped, not configured, or not exposed over target ports of the TPGs 403c-d as denoted by the rows 602c-d of the table 601.

When in the state S1a, there may be no path state information reported to the host 1 412 by the TPGs 401c-d regarding LUN A on DS2 430 because the LUN A is not currently exposed over any path from DS2 430 to the host. The row 602c indicates that an initiator from the host 412 (identified in column 601a) sends a RTPG command to a target port of TPG 2A 401c (identified in column 601b), and where in response to the RTPG command, the TPG2A 401c reports information including that as specified in the reported information (601c). Thus, the row 602c denotes that the reported information (601c) indicates there are no paths from target ports of TPG2A (401c) exposing the LUN A and thus no associated ALUA path state information. The row 602d indicates that an initiator from the host 412 (identified in column 601a) sends a RTPG command to a target port of TPG 2B 401d (identified in column 601b), and where in response to the RTPG command, the TPG2B 401d reports information including that as specified in the reported information (601c). Thus, the row 602d denotes that the reported information (601c) indicates there are no paths from target ports of TPG2B (401d) exposing the LUN A and thus no associated ALUA path state information.

ALUA path states similar to those noted above in connection with the table 601 and the state S1a can be reported if host access to the stretched LUN is first configured on DS2 430 rather than DS 410. Thus, ALUA path states reported for the state S1a can be similarly reported when the host connectivity is in the state S1b. This is discussed in more detail below in connection with the table 603.

The table 603 illustrates information reported to target ports of the host 412 when the system is in the state S1b, where the LUN A configured as V2 425b on DS2 430 is mapped or exposed to the host 412 by DS2 430, and where there is no established connectivity between the host 412 and DS1 410 for the LUN A. In this case in accordance with the techniques of the present disclosure, DS 430 can be preconfigured to report the fully populated uniform host configuration for the host 412 even though host 412 access to the LUN A is not yet configured and established on DS 410. In other words, the information in the table 603 can be reported when the LUN A configured as V1 425a on DS 410 is exposed to the host 412, and where LUN A is not exposed to the host 412 over any path between the host 412 and the DS 410. As illustrated in the table 603, target ports of DS 430 report ALUA path state information in accordance with the fully populated uniform host configuration of the host 412 with respect to the LUN A across the systems 410, 430 even though the LUN A is not exposed to the host 412 over any path from the DS 410.

The table 603 includes the following columns: requesting host 603a, TPG receiving the RTPG command 603b, and reported information 603c. Each row of the table 603 denotes information reported by a particular target port of a TPG for the LUN A in response to any target port of the TPG receiving a RTPG command from an initiator of host 1 412.

The row 604c indicates that an initiator from the host 412 (identified in column 603a) sends a RTPG command to a target port of TPG 2A 401c (identified in column 603b), and where in response to the RTPG command, the TPG2A 401 reports information including that as specified in the reported information (603c). The row 604c denotes that the reported information (601c) indicates paths from target ports of TPG1A (401a) are AO, and that paths from the target ports TPG1B (401b), TPG2A (401c) and TPG2B (401d) are ANO.

The row 604d indicates that an initiator from the host 412 (identified in column 603a) sends a RTPG command to a target port of TPG 2B 401c (identified in column 603b), and where in response to the RTPG command, the TPG2B 401c reports information including that as specified in the reported information (603c). The row 604d denotes that the reported information (604c) indicates paths from target ports of TPG1A (401a) are AO, and that paths from the target ports TPG1B (401b), TPG2A (401c) and TPG2B (401d) are ANO. Thus, in the state S1b, target ports of TPG2A 401c and TPG2B 401d both report the same fully populated configuration information for the uniform host connectivity configuration for the stretched LUN A.

However, when in the state S1b, the path state information reported by TPGs 401c-d of DS 430 regarding the TPGs 401a-b of DS 410 is not current. The host 412 can use current information retrieved from the target ports of TPGs 401a-b regarding the stretched LUN. In particular, the host 412 can use current information retrieved from the TPG 401a to determine information, such as the ALUA path state information, regarding the stretched LUN A and the target ports of TPG 401a; and the host 412 can use current information retrieved from the TPG 401b to determine information, such as the ALUA path state information, regarding the stretched LUN A and the target ports of TPG 401b. For example, the host 412 can issue a RTPG command regarding the stretched LUN A to target ports of the TPG 401a to determine the current, correct, up to date ALUA path state information regarding the stretched LUN A and the target ports of TPG 401a; and the host 412 can issue a RTPG command regarding the stretched LUN A to target ports of the TPG 401b to determine the current, correct, up to date ALUA path state information regarding the stretched LUN A and the target ports of TPG 401b. In this example with the state S1b, the host 412 can discover, such as using the RTPG or other suitable command(s), that the stretched LUN A is not mapped, not configured, or not exposed over target ports of the TPGs 401a-b as denoted by the rows 604a-b of the table 601.

When in the state S1b, there may be no path state information reported to the host 412 by the TPGs 401a-b regarding LUN A on DS 410 because the LUN A is not currently exposed over any path from DS 410 to the host. The row 604a indicates that an initiator from the host 412 (identified in column 603a) sends a RTPG command to a target port of TPG1A 401a (identified in column 603b), and where in response to the RTPG command, the TPG1A 401a reports information including that as specified in the reported information (603c). Thus, the row 604a denotes that the reported information (603c) indicates there are no paths from target ports of TPG1A (401c) exposing the LUN A and thus no associated ALUA path state information. The row 604b indicates that an initiator from the host 412 (identified in column 603a) sends a RTPG command to a target port of TPG 1B 401b (identified in column 603b), and where in response to the RTPG command, the TPG1B 401b reports information including that as specified in the reported information (603c). Thus, the row 604b denotes that the reported information (603c) indicates there are no paths from target ports of TPG1B (401a) exposing the LUN A and thus no associated ALUA path state information.

Once the host 412 access to the stretched LUN A is configured and established for both DS 410 and DS 430 (e.g., the state S2), the complete set of the fully populated uniform host connectivity can be reported over all target ports across DS 410 and DS 430 as discussed below in connection with the table 605.

The table 605 illustrates information reported to the host 412 with the state S2 where the LUN A configured as V1 425a on DS1 410 is mapped or exposed to the host 412 by DS1 410, and also where the LUN A configured as V2 425b is mapped or exposed to the host 412 by DS 430. Generally, the state S2 denotes the fully populated uniform host connectivity for the host 412 with respect to the stretched LUN A. The state S2 can result subsequent performing processing which establishes the state S1a for which information can be reported as in the table 601. Additionally, the state S2 can result subsequent to performing processing to establish the state S1b for which information is reported as in the table 603. In this state S3, information about LUN A is reported by target ports of both the DS 410 and the DS2 430 since LUN A is mapped, exposed or visible to the host 412 over paths from both DS1 410 and DS2 430.

The table 605 includes the following columns: requesting host 605a, TPG receiving the RTPG command 605b, and reported information 605c. Each row of the table 605 denotes information reported by a particular target port of a TPG for the LUN A in response to any target port of the TPG receiving a RTPG command from an initiator of host 1 412. The row 606a indicates that an initiator from the host 412 (identified in column 605a) sends a RTPG command to a target port of TPG 1A 401a (identified in column 605b), and where in response to the RTPG command, the TPG1A 401a reports information including that as specified in the reported information (605c). The row 606a denotes that the reported information (605c) indicates paths from target ports of TPG1A (401a) are AO and paths from all of the target ports TPG1B (401b), TPG2A (401c) and TPG2B (401d) are ANO.

The row 606b indicates that an initiator from the host 412 (identified in column 605a) sends a RTPG command to a target port of TPG 1B 401b (identified in column 605b), and where in response to the RTPG command, the TPG1B 401b reports information including that as specified in the reported information (605c). The row 606b denotes that the reported information (605c) indicates paths from target ports of TPG1A (401a) are AO and paths from all of the target ports TPG1B (401b), TPG2A (401c) and TPG2B (401d) are ANO.

The row 606c indicates that an initiator from the host 412 (identified in column 605a) sends a RTPG command to a target port of TPG 2A 401c (identified in column 605b), and where in response to the RTPG command, the TPG2A 401c reports information including that as specified in the reported information (605c). The row 606c denotes that the reported information (605c) indicates paths from target ports of TPG1A (401a) are AO and paths from all of the target ports TPG1B (401b), TPG2A (401c) and TPG2B (401d) are ANO.

The row 606d indicates that an initiator from the host 412 (identified in column 605a) sends a RTPG command to a target port of TPG 2B 401d (identified in column 605b), and where in response to the RTPG command, the TPG2B 401d reports information including that as specified in the reported information (605c). The row 606d denotes that the reported information (605c) indicates paths from target ports of TPG1A (401a) are AO and paths from all of the target ports TPG1B (401b), TPG2A (401c) and TPG2B (401d) are ANO.

The element 620e denotes those paths from the TPG1A to the host 412 are reported as AO.

Using the techniques of the present disclosure in connection with the fully populated uniform host connectivity configuration for the host 412, when host connectivity for the stretched LUN is established for the host 412 to only a first DS of the DS pair (410, 430) but not the second remaining one of the DSs (410, 430), the first DS can use the preconfigured fully populated uniform host connectivity information to report expected ALUA state information regarding the paths to the second DS which are expected to be established once implementation of the fully populated configuration is complete (e.g., configured and established host connectivity to the second DS for the stretched LUN is complete). In at least one embodiment while establishing the fully populated configuration, the first DS does not need to know the current status of the fully populated configuration with respect to the stretched LUN on the second DS in order to report ALUA path state information for target ports of the second DS and the stretched LUN. Rather, the first DS can use its preconfigured fully populated uniform host connectivity information. In this manner in at least one embodiment, the first DS can omit synchronizing and communicating ALUA path state information regarding paths/target ports/TPGs of the second DS with respect to the stretched LUN in order to provide the first DS with ALUA path state information regarding the target state of the fully populated uniform host connectivity configuration.

Referring to FIG. 9B, the example 650 illustrates tables of information that can be reported to the host 432 with respect to the stretched LUN A at various points in time in connection with configuring and establishing host connectivity for the host 432 to the systems 410, 430 exposing the stretched LUN A configured from the volumes 425a, 425b. In particular, the example 650 illustrates information that can be reported to the host 432 in accordance with the techniques of the present disclosure in response to various RTPG commands sent to target ports of DS1 410 and DS2 430. Generally, the information reported as described in the example 650 is similar to that as described in connection with the example 600 for the host 412 with the difference that different paths are AO or ANO depending on the particular host.

The table 651 illustrates information reported to the host 432 when the configuration is in the state S3a, where the LUN A configured as V1 425a on DS1 410 is mapped or exposed to the host 432 by DS1 410, and where there is no established connectivity between the host 432 and DS2 430 for the LUN A. In this case in accordance with the techniques of the present disclosure, DS 410 can be preconfigured to report the fully populated uniform host configuration for the host 432 even though host 432 access to the LUN A is not yet configured and established on DS2 430. In other words, the information in the table 651 can be reported when the LUN A configured as V1 425a on DS 410 is exposed to the host 432, and where LUN A is not exposed to the host 432 over any path between the host 432 and the DS 430. As illustrated in the table 651, target ports of DS 410 report ALUA path state information in accordance with the fully populated uniform host configuration of the host 432 with respect to the LUN A across the systems 410, 430 even though the LUN A is not exposed to the host 432 over any path from the DS 430.

The table 651 includes the following columns: requesting host 651a, TPG receiving the RTPG command 651b, and reported information 651c. Each row of the table 651 denotes information reported by a particular target port of a TPG for the LUN A in response to any target port of the TPG receiving a RTPG command from an initiator of host 432.

The row 652a indicates that an initiator from the host 432 (identified in column 651a) sends a RTPG command to a target port of TPG 1A 401a (identified in column 651b), and where in response to the RTPG command, the TPG1A 401a reports information including that as specified in the reported information (651c). The row 652a denotes that the reported information (651c) indicates paths from target ports of TPG2A (401c) are AO, and that paths from the target ports TPG1A (401a), TPG1B (401b), and TPG2B (401d) are ANO. The row 652b indicates that an initiator from the host 432 (identified in column 651a) sends a RTPG command to a target port of TPG 1B 401b (identified in column 651b), and where in response to the RTPG command, the TPG1B 401b reports information including that as specified in the reported information (651c). The row 652b denotes that the reported information (651c) indicates paths from target ports of TPG2A (401c) are AO, and that paths from the target ports TPG1A (401a), TPG1B (401b), and TPG2B (401d) are ANO. Thus, in the state S3a, target ports of TPG1A 401a and TPG1B 401b both report the same fully populated configuration information for the uniform host connectivity configuration for the stretched LUN A.

However, when in the state S3a, the path state information reported by TPGs 401a-b of DS 410 regarding the TPGs 401c-d of DS 430 is not current. The host 432 can use current information retrieved from the target ports of TPGs 403c-d regarding the stretched LUN. In particular, the host 432 can use current information retrieved from the TPG 403c to determine information, such as the ALUA path state information, regarding the stretched LUN A and the target ports of TPG 403c; and the host 432 can use current information retrieved from the TPG 403d to determine information, such as the ALUA path state information, regarding the stretched LUN A and the target ports of TPG 403d. For example, the host 432 can issue a RTPG command regarding the stretched LUN A to target ports of the TPG 403c to determine the current, correct, up to date ALUA path state information regarding the stretched LUN A and the target ports of TPG 403c; and the host 432 can issue a RTPG command regarding the stretched LUN A to target ports of the TPG 403d to determine the current, correct, up to date ALUA path state information regarding the stretched LUN A and the target ports of TPG 403d. In this example with the state S3a, the host 432 can discover, such as using the RTPG command, that the stretched LUN A is not mapped, not configured, or not exposed over target ports of the TPGs 403c-d as denoted by the rows 652c-d of the table 651.

When in the state S3a, there may be no path state information reported to the host 432 by the TPGs 401c-d regarding LUN A on DS2 430 because the LUN A is not currently exposed over any path from DS2 430 to the host 432. The row 652c indicates that an initiator from the host 432 (identified in column 651a) sends a RTPG command to a target port of TPG 2A 401c (identified in column 651b), and where in response to the RTPG command, the TPG2A 401c reports information including that as specified in the reported information (651c). Thus, the row 652c denotes that the reported information (651c) indicates there are no paths from target ports of TPG2A (401c) exposing the LUN A to the host 432 and thus no associated ALUA path state information. The row 652d indicates that an initiator from the host 432 (identified in column 651*a*) sends a RTPG command to a target port of TPG 2B 401*d* (identified in column 651*b*), and where in response to the RTPG command, the TPG2B 401*d* reports information including that as specified in the reported information (651*c*). Thus, the row 652*d* denotes that the reported information (651*c*) indicates there are no paths from target ports of TPG2B (401*d*) exposing the LUN A to the host 432 and thus no associated ALUA path state information.

ALUA path states similar to those noted above in connection with the table 651 and the state S3*a* can be reported if host access to the stretched LUN is first configured on DS2 430 rather than DS 410. Thus, ALUA path states reported for the state S3*a* can be similarly reported when the host connectivity is in the state S3*b*. This is discussed in more detail below in connection with the table 653.

The table 653 illustrates information reported to target ports of the host 432 when the system is in a state S3*b*, where the LUN A configured as V2 425*b* on DS2 430 is mapped or exposed to the host 432 by DS2 430, and where there is no established connectivity between the host 432 and DS1 410 for the LUN A. In this case in accordance with the techniques of the present disclosure, DS 430 can be preconfigured to report the fully populated uniform host configuration for the host 432 even though host 432 access to the LUN A is not yet configured and established on DS 410. In other words, the information in the table 653 can be reported when the LUN A configured as V1 425*a* on DS 410 is exposed to the host 432, and where LUN A is not exposed to the host 432 over any path between the host 432 and the DS 410. As illustrated in the table 653, target ports of DS 430 report ALUA path state information in accordance with the fully populated uniform host configuration of the host 432 with respect to the LUN A across the systems 410, 430 even though the LUN A is not exposed to the host 432 over any path from the DS 410.

The table 653 includes the following columns: requesting host 653*a*, TPG receiving the RTPG command 653*b*, and reported information 653*c*. Each row of the table 653 denotes information reported by a particular target port of a TPG for the LUN A in response to any target port of the TPG receiving a RTPG command from an initiator of host 432.

The row 654*c* indicates that an initiator from the host 432 (identified in column 653*a*) sends a RTPG command to a target port of TPG 2A 401*c* (identified in column 653*b*), and where in response to the RTPG command, the TPG2A 401 reports information including that as specified in the reported information (653*c*). The row 654*c* denotes that the reported information (651*c*) indicates paths from target ports of TPG2A (401*c*) are AO, and that paths from the target ports TPG1A (401*a*), TPG1B (401*b*), and TPG2B (401*d*) are ANO.

The row 654*d* indicates that an initiator from the host 432 (identified in column 653*a*) sends a RTPG command to a target port of TPG 2B 401*c* (identified in column 653*b*), and where in response to the RTPG command, the TPG2B 401*c* reports information including that as specified in the reported information (653*c*). The row 654*d* denotes that the reported information (651*c*) indicates paths from target ports of TPG2A (401*c*) are AO, and that paths from the target ports TPG1A (401*a*), TPG1B (401*b*), and TPG2B (401*d*) are ANO. Thus, in the state S3*b*, target ports of TPG2A 401*c* and TPG2B 401*d* both report the same fully populated configuration information for the uniform host connectivity configuration for the stretched LUN A.

However, when in the state S3*b*, the path state information reported by TPGs 401*c*-*d* of DS 430 regarding the ALUA state with respect to the stretched LUN and TPGs 401*a*-*b* of DS 410 is not current. The host 432 can use current information retrieved from the target ports of TPGs 401*a*-*b* regarding the stretched LUN. In particular, the host 432 can use current information retrieved from the TPG 401*a* to determine information, such as the ALUA path state information, regarding the stretched LUN A and the target ports of TPG 401*a*; and the host 432 can use current information retrieved from the TPG 401*b* to determine information, such as the ALUA path state information, regarding the stretched LUN A and the target ports of TPG 401*b*. For example, the host 432 can issue a RTPG command regarding the stretched LUN A to target ports of the TPG 401*a* to determine the current, correct, up to date ALUA path state information regarding the stretched LUN A and the target ports of TPG 401*a*; and the host 432 can issue a RTPG command regarding the stretched LUN A to target ports of the TPG 401*b* to determine the current, correct, up to date ALUA path state information regarding the stretched LUN A and the target ports of TPG 401*b*. In this example with the state S3*b*, the host 432 can discover, such as using the RTPG command, that the stretched LUN A is not mapped, not configured, or not exposed over target ports of the TPGs 403*a*-*d* as denoted by the rows 604*a*-*b* of the table 601.

When in the state S3*b*, there may be no path state information reported to the host 432 by the TPGs 401*a*-*b* regarding LUN A on DS 410 because the LUN A is not currently exposed over any path from DS 410 to the host 432. The row 654*a* indicates that an initiator from the host 432 (identified in column 653*a*) sends a RTPG command to a target port of TPG 1A 401*a* (identified in column 653*b*), and where in response to the RTPG command, the TPG1A 401*a* reports information including that as specified in the reported information (653*c*). Thus, the row 654*a* denotes that the reported information (653*c*) indicates there are no paths from target ports of TPG1A (401*c*) exposing the LUN A and thus no associated ALUA path state information. The row 654*b* indicates that an initiator from the host 432 (identified in column 653*a*) sends a RTPG command to a target port of TPG 1B 401*b* (identified in column 653*b*), and where in response to the RTPG command, the TPG1B 401*b* reports information including that as specified in the reported information (653*c*). Thus, the row 654*b* denotes that the reported information (653*c*) indicates there are no paths from target ports of TPG1B (401*a*) to the host 432 exposing the LUN A and thus no associated ALUA path state information.

Once the host 432 access to the stretched LUN A is configured and established for both DS 410 and DS 430 (e.g., the state S4), the complete set of the fully populated uniform host connectivity can be reported over all target ports across DS 410 and DS 430 as discussed below in connection with the table 655.

The table 655 illustrates information reported to the host 432 with the state S4 where the LUN A configured as V1 425*a* on DS1 410 is mapped or exposed to the host 432 by DS1 410, and also where the LUN A configured as V2 425*b* is mapped or exposed to the host 432 by DS 430. Generally, the state S4 denotes the fully populated uniform host connectivity is established for the host 412 with respect to the stretched LUN A. The state S4 can result subsequent to performing processing which establishes the state S3*a* for which information can be reported as in the table 651. Additionally, the state S4 can result subsequent to performing processing to establish the state S3*b* for which information is reported as in the table 653. In this state S4, information about LUN A is reported by target ports of both the DS 410 and the DS2 430 since LUN A is mapped, exposed or visible to the host 432 over paths from both DS1 410 and DS2 430.

The table 655 includes the following columns: requesting host 655a, TPG receiving the RTPG command 655b, and reported information 655c. Each row of the table 655 denotes information reported by a particular target port of a TPG for the LUN A in response to any target port of the TPG receiving a RTPG command from an initiator of host 432. The row 656a indicates that an initiator from the host 432 (identified in column 655a) sends a RTPG command to a target port of TPG 1A 401a (identified in column 655b), and where in response to the RTPG command, the TPG1A 401a reports information including that as specified in the reported information (655c). The row 656a denotes that the reported information (655c) indicates paths from target ports of TPG2A (401c) are AO, and paths from all of the target ports TPG1A (401a), TPG1B (401b), and TPG2B (401d) are ANO.

The row 656b indicates that an initiator from the host 432 (identified in column 655a) sends a RTPG command to a target port of TPG 1B 401b (identified in column 655b), and where in response to the RTPG command, the TPG1B 401b reports information including that as specified in the reported information (655c). The row 656b denotes that the reported information (655c) indicates paths from target ports of TPG2A (401c) are AO, and paths from all of the target ports TPG1A (401a), TPG1B (401b), and TPG2B (401d) are ANO.

The row 656c indicates that an initiator from the host 432 (identified in column 655a) sends a RTPG command to a target port of TPG 2A 401c (identified in column 655b), and where in response to the RTPG command, the TPG2A 401c reports information including that as specified in the reported information (655c). The row 656c denotes that the reported information (655c) indicates paths from target ports of TPG2A (401c) are AO, and paths from all of the target ports TPG1A (401a), TPG1B (401b), and TPG2B (401d) are ANO.

The row 656d indicates that an initiator from the host 432 (identified in column 655a) sends a RTPG command to a target port of TPG 2B 401d (identified in column 655b), and where in response to the RTPG command, the TPG2B 401d reports information including that as specified in the reported information (655c). The row 656d denotes that the reported information (655c) indicates paths from target ports of TPG2A (401c) are AO, and paths from all of the target ports TPG1A (401a), TPG1B (401b), and TPG2B (401d) are ANO.

The element 670e denotes those paths from the TPG2A to the host 432 are reported as AO.

The techniques of the present disclosure, such as described in connection with FIGS. 9A and 9B, can be contrasted to an implementation not using the techniques of the present disclosure such as described in connection with FIGS. 8A and 8B. The techniques of the present disclosure can be used in at least one embodiment where each of the data storage systems can be preconfigured with the fully populated uniform host connectivity information for reporting purposes such as in response to RTPG commands. A data storage system having established connectivity with the host with respect to an exposed stretched LUN can report ALUA state information for the fully populated configuration even if the fully populated configuration is not yet actually established (e.g., no connectivity established between the host and another data storage system with respect to stretched LUN). Each data storage system can be configured independently and can report ALUA state information in accordance with the fully populated uniform host connectivity information once host connectivity for the stretched LUN is established even if the complete uniform host connectivity is not established for the stretched LUN from the host to both data storage systems. In this manner, each data storage system can be configured to have and report information regarding the fully populated configuration without communicating with the other data storage system. In at least one embodiment, once uniform host connectivity has been established for the stretched LUN across both systems 410, 432, the data storage systems can subsequently communicate and coordinate path state information used for reporting purposes. In this manner, a querying host can acquire information regarding the fully populated uniform host configuration for a stretched LUN even if connectivity for the stretched LUN's uniform host configuration is not completely established (e.g., only established to one of the data storage systems 410, 432 but not established for the second remaining one of the data storage systems 410, 432). In at least one embodiment, configuration information, such as the fully populated uniform host connectivity information, can be stored in a Mgt. DB of each data storage system. The stored configuration information can be used by the data storage system to report information such as the ALUA path state and other information in response to various commands, such as the RTPG command. In at least one embodiment, once the fully populated information host connectivity configuration for a host is established, the data storage systems 410, 432 can further communicate with one another, as may be needed, to update configuration information of their respective Mgt. DBs. However, in at least one embodiment in accordance with the techniques of the present disclosure, such complex coordination and exchange of communications and information between the systems 410, 432 can be omitted while establishing and configuring the host connectivity for the stretched LUN.

Figure 10:
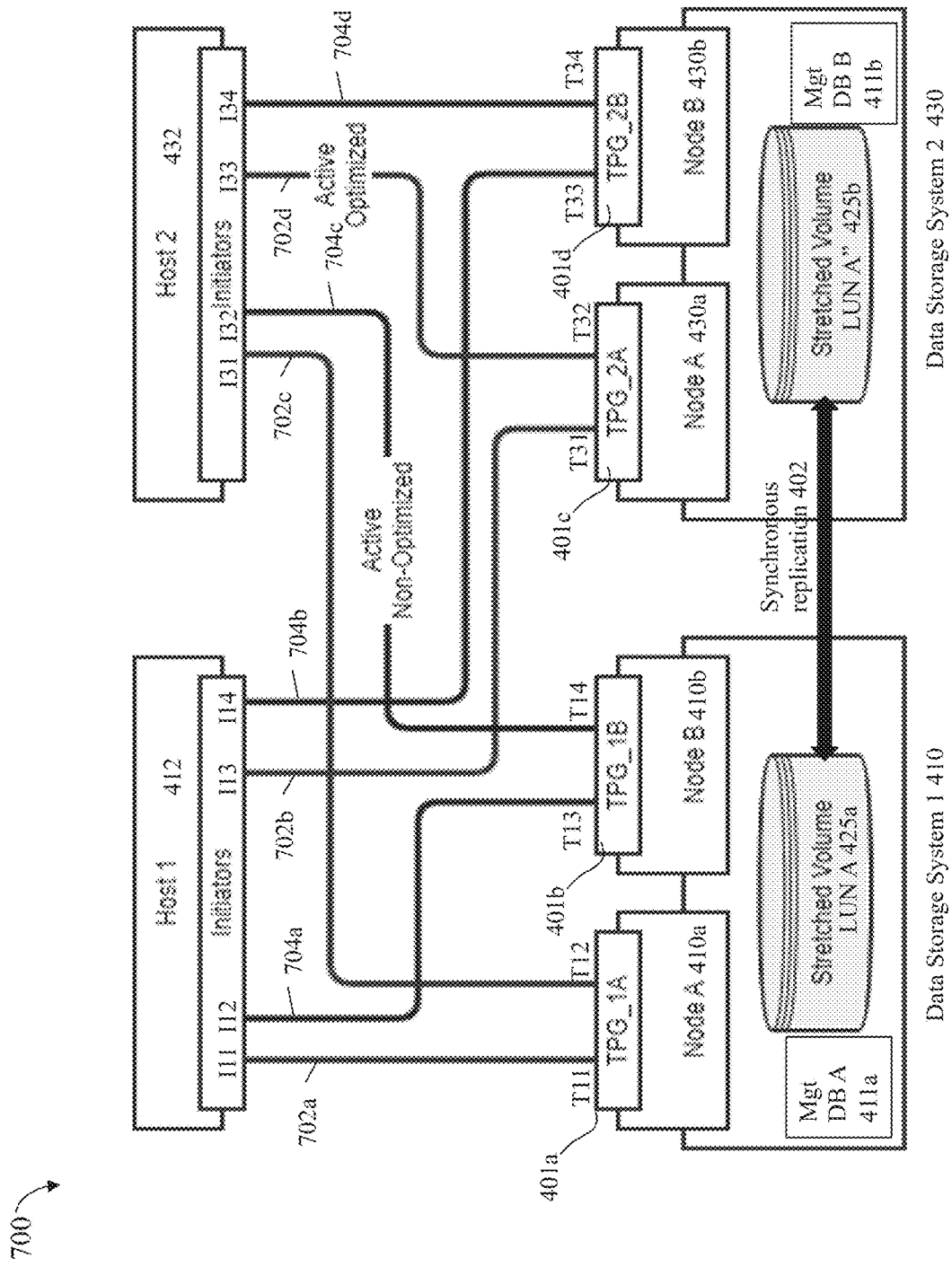

Referring to FIG. 10, shown is another example 700 of components of a fully populated uniform host connectivity configuration in at least one embodiment in accordance with the techniques of the present disclosure.

The example 700 of FIG. 10 can include components as described in connection with FIG. 7A with differences discussed below. In this example 700, both data storage systems 410 and 430 can be approximately the same distance from each single connected host 412, 432. In at least one embodiment, the hosts 412, 432 and the data storage systems 410, 430 of FIG. 10 can be located within the same data center, and more generally, in relatively close physical proximity to one another. More generally with reference to FIG. 10, there may be no substantive difference in I/O latency due to distance between a host, such as 412, and each of the data storage systems 410, 430 so that the host 412 can issue I/Os directed to either or both of the data storage systems 410, 430 without adversely affecting I/O latency.

As noted above in FIG. 7A, the data storage system 410 can be characterized as local with respect to the host 412, and the data storage system 430 can be characterized as remote with respect to the host 412 such that under normal operating conditions, paths between the host 412 and the system 410 can be active optimized, and paths between the host 412 and the system 430 can be active non-optimized. In this manner, the host 412 issues I/Os directed to the volume 425a of the stretched LUN A on the system 410 rather than the volume 425b of the stretched LUN A on the system 430. As also noted above in FIG. 7A, the data storage system 430 can be characterized as local with respect to the host 432, and the data storage system 410 can be characterized as remote with respect to the host 432 such that under normal operating conditions, paths between the host 432 and the system 430 can be active optimized, and paths between the host 432 and the system 410 can be active non-optimized. In this manner, the host 432 issues I/Os directed to the volume 425*b* of the stretched LUN A on the system 430 rather than the volume 425*a* of the stretched LUN A on the system 410.

In contrast to FIG. 7A, each the hosts 412, 432 of FIG. 10 can have active optimized paths to both the data storage systems 410, 430 so that each of the hosts 412, 432 under normal operating conditions can issue I/Os directed to both the volumes 425*a-b* configured as the stretched LUN A.

In one aspect, the host access configuration of FIG. 7A can be characterized as providing uniform host access that is non-equidistant where each of the hosts 412, 432 can be co-located with one of the storage systems 410, 430 within a data center. With FIG. 7A configuration, that each host has active optimized paths to its respective local one of the data storage systems 410, 430 under normal operating conditions. In one aspect, the host access configuration of FIG. 10 can be characterized as providing uniform host access that is equidistant such that each host has active optimized paths to both system 410, 430 under normal operating conditions.

In at least one embodiment, the complete or fully populated configuration of uniform host connectivity or access of FIG. 10 can provide the host 412 with active optimized paths to both the systems 410 and 430, and can provide the host 432 with active optimized paths to both the systems 410 and 430. In at least one embodiment of FIG. 10, the complete uniform host configuration can include the following path states:

1. the paths denoted by 702*a* (I11-T11) between the host 412 and the data storage system 410, and the paths denoted by 702*b* (I13-T31) between the host 412 and the data storage system 430 can be AO.
2. the paths denoted by 702*c* (I31-T12) between the host 432 and the data storage system 410, and the paths denoted by 702*d* (I33-T32) between the host 432 and the data storage system 430 can be AO.
3. the paths denoted by 704*a* (I12-T13) between the host 412 and the data storage system 410, and the paths denoted by 704*b* (I14-T31) between the host 412 and the data storage system 430 can be ANO.
4. the paths denoted by 704*c* ((I32-T14) between the host 432 and the data storage system 410, and the paths denoted by 704*d* (I34-T34) between the host 432 and the data storage system 430 can be ANO.

The techniques of the present disclosure as described above with reference to FIG. 7A can also be used in connection with the above-noted complete fully populated configuration of uniform host connectivity as described in connection with FIG. 10. With the particular embodiment of FIG. 10, the complete fully populated configuration differs in comparison to that of FIG. 7A. However, it is straightforward to implement the techniques of the present disclosure as described in connection with FIGS. 7A, 9A and 9B with the complete fully populated configuration noted above with FIG. 10. More generally, the techniques of the present disclosure can be used in connection with any complete fully populated configuration and is not limited to the particular ones provided herein for the purposes of illustration and example.

Although FIG. 10 illustrates a per path ALUA access state where paths or targets from the same TPG can have different access states, consistent with other discussion herein in at least one embodiment, all target ports included in the same TPG can have the same ALUA access state. In this case with reference to FIG. 10, a connection from a TPG to a host initiator can more generally represent the ALUA path state with respect to all target ports of that TPG to that particular host initiator. For example, the line or connection 702*a* having an associated ALUA path state of active optimized between I11 and T11 can denote multiple paths from the host 412 initiator I11 to all target ports of the TPG1A 401*a*; and the line or connection 704*a* having an associated ALUA path state of active non-optimized between I12 and T13 can denote multiple paths from the host 412 initiator I12 to all target ports of the TPG1*b* 401*b*. In a similar manner, each of the remaining lines or connections between an initiator-target pair (also initiator-TPG pair) can denote multiple paths between the initiator and the target ports of a TPG.

Referring to FIG. 11, shown is an example 800 of the complete configuration of uniform host connectivity in at least one embodiment of the techniques herein using the components of FIG. 10.

The example 800 includes the table 805 illustrating the complete fully populated configuration of uniform host connectivity for the host 1 412 of FIG. 10. The example 800 also includes the table 815 illustrating the complete fully populated configuration of uniform host connectivity for the host 2 432 of FIG. 10 with respect to the stretched LUN A configured from the volumes 425*a*, 425*b* having the same identity from the perspective of the host 41

The table 805 includes the following columns of information: requesting host 805*a*, TPG receiving the RTPG command 805*b*, and reported information 805*c*. The table 805 includes the rows 806*a-d*. Each row identifies the requesting host (host 1 412 in column 805*a*) which issues a RTPG command from any of its initiators to a particular TPG (805*b*) of one of the systems 410, 430 with respect to the stretched LUN A, wherein in response to the RTPG command, the requesting host (initiator thereof which issued the RTPG request) receives reported information (805*c*) describing the ALUA path states of paths between the systems 410, 430 and the host 1 412. In particular, the ALUA path states denote the path states of target ports of TPGs of the systems 410, 430 over which the stretched LUN A is exposed to the host 1 412.

It should be noted that in the complete fully populated configuration of the table 805, the reported information 805*c* regarding ALUA path state information reported for the stretched LUN A to the host 1 412 is that same across all TPGs 401*a-d*.

The row 806*a* denotes information reported to the host 1 412 in response to a target port of the TPG 1A (401*a*) receiving the RTPG command requesting information regarding the stretched LUN A. The reported information 805*c* of the row 806*a* indicates that paths from TPG1A (401*a*) and TPG2A (401*c*) are AO, and that paths from TPG1B (401*b*) and TPG2B (401*d*) are ANO.

The row 806*b* denotes information reported to the host 1 412 in response to a target port of the TPG 1B (401*b*) receiving the RTPG command requesting information regarding the stretched LUN A. The reported information 805*c* of the row 806*b* is the same as described above in connection with the row 806*a*.

The row 806*c* denotes information reported to the host 1 412 in response to a target port of the TPG 2A (401*c*) receiving the RTPG command requesting information regarding the stretched LUN A. The reported information 805*c* of the row 806*c* is the same as described above in connection with the row 806*a*.

The row 806d denotes information reported to the host 1 412 in response to a target port of the TPG 2B (401d) receiving the RTPG command requesting information regarding the stretched LUN A. The reported information 805c of the row 806d is the same as described above in connection with the row 806a.

The elements 807a-b denote the AO paths of the reported information of the table 8

The table 815 includes the following columns of information: requesting host 815a, TPG receiving the 30 RTPG command 815b, and reported information 815c. The table 815 includes the rows 816a-d. Each row identifies the requesting host (host 2 432 in column 815a) which issues a RTPG command from any of its initiators to a particular TPG (815b) of one of the systems 410, 430 with respect to the stretched LUN A, wherein in response to the RTPG command, the requesting host (initiator thereof which issued the RTPG request) receives reported information (815c) describing the ALUA path states of paths between the systems 410, 430 and the host 1 432. In particular, the ALUA path states denote the path states of target ports of TPGs of the systems 410, 430 over which the stretched LUN A is exposed to the host 1 432.

It should be noted that in the complete configuration of the table 815, the reported information 815c regarding ALUA path state information reported for the stretched LUN A to the host 2 432 is that same across all TPGs 401a-d.

The row 8016a denotes information reported to the host 2 432 in response to a target port of the TPG 1A (401a) receiving the RTPG command requesting information regarding the stretched LUN A. The reported information 815c of the row 816a indicates that paths from TPG1A (401a) and TPG2A (401c) are active optimized (AO), and that paths from TPG1B (401b) and TPG2B (401d) are active non-optimized (ANO).

The row 816b denotes information reported to the host 2 432 in response to a target port of the TPG 1B (401b) receiving the RTPG command requesting information regarding the stretched LUN A. The reported information 815c of the row 816b is the same as described above in connection with the row 816a.

The row 816c denotes information reported to the host 3 432 in response to a target port of the TPG 2A (401c) receiving the RTPG command requesting information regarding the stretched LUN A. The reported information 815c of the row 816c is the same as described above in connection with the row 816a.

The row 816d denotes information reported to the host 3 432 in response to a target port of the TPG 2B (401d) receiving the RTPG command requesting information regarding the stretched LUN A. The reported information 815c of the row 816d is the same as described above in connection with the row 816a.

The elements 807c-d denote the AO paths of the reported information of the table 815.

The table 805 denotes the path state information reported to the host 412 for various target ports regarding the stretched LUN A once the fully populated uniform host connectivity of FIG. 10 is established (e.g., the host 412-DS 410 is established and the host 412-DS 430 connectivity is established). Consistent with discussion above in connection with FIG. 9A, the established fully populated configuration for the host 412 can be achieved by configuring and establishing host 412 connectivity to the systems 410, 420 in any order. For example, if the host 412-DS 410 connectivity is first established prior to the host 412-DS 430, where the stretched LUN A (volume 425a) is exposed to the host 412, but where the host 412-DS 430 connectivity is not yet established (e.g., the volume 425b configured as the LUN A is not exposed to the host 412 over any paths from the DS 430), then the DS 410 can report information consistent with the fully populated configuration but the DS 430 can report no path state information for the stretched LUN A. For example, if the host 412-DS 430 connectivity is first established prior to the host 412-DS 410, where the stretched LUN A (volume 425b) is exposed to the host 412, but where the host 412-DS 410 connectivity is not yet established (e.g., the volume 425a configured as the LUN A is not exposed to the host 412 over any paths from the DS 410), then the DS 430 can report information consistent with the fully populated configuration but the DS 410 can report no path state information for the stretched LUN A.

Referring to FIGS. 12A-C, shown is a flowchart 900, 950, 960 of processing steps that can be performed in at least one embodiment in accordance with the techniques of the present disclosure. With reference to FIG. 7A and FIG. 9A, the FIGS. 12A-C illustrate processing that can be performed in connection with configuring and establishing a fully populated uniform host configuration with respect to the host 412 where connectivity is first configured and established for DS 410 and then subsequently connectivity is configured and established for DS 430. More generally, similar processing can be performed with respect to any host such as the host 432. Also, it is straightforward in light of other discussion above to similarly perform processing in connection with configuring and establishing host connectivity to individual data storage systems in a different order than that as specified in the FIGS. 12A-C for example and illustration.

At the step 902, processing can be performed at a first point in time PT1 to configure and establish connectivity for the host 412 to access the stretched "LUN A" on DS 410. A first volume or LUN, V1 425a, on DS 410 can be configured to have the identity of "LUN A" as presented or exposed to the host 412 over one or more paths from DS 410. The one or more paths can generally be between one or more initiators of the host 412 and one or more target ports or TPGs 410a-b of the DS 410. Configuration information, such as may be stored in the Mgt DB A 411a, of DS 410 can be updated to include the fully populated uniform host connectivity information for the host 412. At this point in time PT1, the fully populated uniform host connectivity can be characterized as preconfigured or predetermined in that it may not reflect the current, actual or up to date established host connectivity with respect to the stretched LUN A, the host 412, DS 410 and DS 430. In at least one embodiment at the time PT1, only host 412-DS 410 connectivity can be established so that the stretched LUN A is only exposed of one or more paths of the DS 410, and so that the stretched LUN A is not yet exposed over any path of the DS 430. In at least one embodiment, the configuration information of the DS 410 can be updated to include the ALUA path state information as illustrated in the table 601 of FIG. 9A for use in reporting ALUA path state information regarding the stretched LUN A, for example, in response to a RTPG command received at a target port of DS 410 or DS 430. From the step 902, control proceeds to the step 904.

At the step 904 at second point in time PT2 which is subsequent to PT1, an initiator Ix of the host 412 can send a first RTPG command to a target port Tx of DS 410 requesting information regarding the stretched LUN A, which is configured from V1 425a on DS 410. At the second point in time PT2, the configuration can be in the state Sla where the host 412-DS 410 connectivity is established so that V1 425a configured as LUN A is exposed to the host 412 over one or paths from DS 410, but where the host 412-DS430 connectivity is not yet established so that LUN A is not exposed to the host 412 over any path from DS 430. In response to the first RTPG command received at the target port Tx of DS 410, Tx can send a first response R1 to Ix of the host 412 with information regarding the LUN A. Tx of DS 410 can use the configuration information as stored in the Mgt DB A 411*a* of DS 410 to include in the first response to the first RTPG command returned to Ix of the host 412. In particular, Tx of DS 410 can report information from the fully populated uniform host connectivity information for the host 412 in the first response R1 to the first RTPG command. With reference to the table 601 of FIG. 9A, Tx of DS 410 is included in either TPG 401*a* or 401*b* and can thus report ALUA path state information as denoted by the column 601*c* of the corresponding row 602*a* or 602*b*. From the step 904 control proceeds to the step 906.

At the step 906 at a third point in time PT3 which is subsequent to PT2, the initiator Ix of the host 412 can send a second RTPG command to a target port Ty of DS 432 requesting information regarding the stretched LUN A. At the time PT3, the configuration can still be in the state S1a where the host 412-DS 410 connectivity is established so that V1 425*a* configured as LUN A is exposed to the host 412 over one or paths from DS 410, but where the host 412-DS430 connectivity is not yet established so that LUN A is not exposed to the host 412 over any path from DS 430. In response to the second RTPG command received at the target port Ty of DS 430, Ty can send a second response R2 to Ix of the host 412 indicating that there is no path and thus no path information regarding the LUN A since the LUN A is currently not exposed to the host 412 over any path from DS 430. At the time PT3, Ty of DS 430 is either included in TPG 401*c* of 401*d* so that the indication of no path and no path information regarding LUN A corresponds to the reported information 601*c* as denoted by the rows 602*c-d* of the table 601. From the step 906, control proceeds to the step 908.

At the step 908, the host 412 can detect the inconsistency between the ALUA path state information for the LUN A as reported in the first response R1 and the second response R2. For example, R1 can indicate that a first path Ix-Ty is ANO; and R2 can indicate that the same first path Ix-Ty is AO. ALUA path state information regarding Ty as reported by Ty can be considered as the current, up to date information regarding Ty since Ty is the authoritative target port for reporting information about Ty. In other words, ALUA path state information which Ty reports about itself (e.g., paths including Ty) can be considered as the current or correct information about Ty. In this case, the host 412 can resolve the inconsistency regarding the ALUA path state of Ix-Ty by using the current information about Ix-Ty as reported in R2 from Ty. The host 412 can use the current path state information regarding the LUN A for any suitable purpose. For example, the host 412 can use the current path state information regarding LUN A to select a path over which to send an I/O directed to the LUN A. In at least one embodiment, the host 412 can send the I/O over an AO path to the LUN A. In some embodiments, there can be multiple AO paths to the LUN A where the host 412 can use any suitable technique to select one of the multiple AO paths over which to send the I/O to the LUN A. In at least one embodiment, the MP driver of the host 412 can perform such path selection for sending the I/O to the LUN A. From the step 908, control proceeds to the step 910.

At the step 910 at a fourth point in time PT4 which is subsequent to PT3, processing can be performed to configure and establish connectivity for the host 412 to access the stretched "LUN A" on DS 430. A second volume or LUN, V2 425*b*, on DS 430 can be configured to have the identity of "LUN A" as presented or exposed to the host 412 over one or more paths from DS 430. The one or more paths can generally be between one or more initiators of the host 412 and one or more target ports or TPGs 410*c-d* of the DS 430. From the step 910, control proceeds to the step 912.

In at least one embodiment, the step 910 can also include configuring the volume pair (V1 425*a*, V2 425*b*) for two-way or bi-directional synchronous replication as described in more detail elsewhere herein.

At the step 912 at a fifth point in time PT5 which is subsequent to PT4, the initiator Ix of the host 412 can send a third RTPG command to a target port T of either the DS 410 or the DS 430 requesting information regarding the stretched LUN A, which is configured as V1 425*a* on DS 410 and V2 425*b* on DS 430. At the point in time PT5, the configuration can be in the state S2 where the host 412-DS 410 connectivity is established so that V1 425*a* configured as LUN A is exposed to the host 412 over one or paths from DS 410, and also where the host 412-DS430 connectivity is established so that LUN A is exposed to the host 412 over paths from both DS 410 and also from DS 430.

In the step 912 in response to the third RTPG command received at the target port T of DS 410, T can send a response to Ix of the host 412 with information regarding the LUN A. If T is in DS 410, T can use the configuration information as stored the either Mgt DB A 411*a* of DS 410 to include in the response. If T is in DS 430, T can use the configuration information as stored the Mgt DB B 411*b* of DS 410 to include in the response. In particular, T can include information from the fully populated uniform host connectivity information for the host 412 in the response to the RTPG command. With reference to the table 605 of FIG. 9A, T is included in one of the TPGs 401*a-d* and can thus report ALUA path state information as denoted by the column 601*c* of the corresponding one of the rows 606*a-d* denoting the same fully populated uniform host connectivity information regarding LUN A for the host 412.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
    establishing connectivity for a host to access a logical device L1 over a first path P1 between the host and a first data storage system DS1, wherein a first volume V1 on DS1 is configured as L1, and wherein V1 is exposed to the host as L1 over P1 between the host and DS1;

updating first configuration information of DS1 to include a fully populated uniform host connectivity information for the host, wherein the fully populated uniform host connectivity information includes first path state information and second path state information, wherein the first path state information includes path state information regarding P1 between the host and DS1 over which L1 is exposed to the host, and wherein the second path state information includes path state information regarding a second path P2 between the host and a second data storage system DS2 over which L1 is exposed to the host, and wherein at a first point in time, T1 is established, P2 is not yet established, L1 is exposed over P1 to the host, and L1 is not exposed over P2 to the host; and at the first point in time T1 and prior to establishing connectivity for the host to access L1 over P2 between the host and DS2, performing first processing including:

reporting, by DS1 at the first point in time T1, first information regarding L1 to the host, wherein the first information includes a first path state S1 regarding P1 whereby S1 denotes P1 is established, and wherein the first information includes a second path state S2 regarding P2 whereby S2 denotes P2 is established, and wherein S1 and S2 are included in the fully populated uniform host connectivity information.

2. The computer-implemented method of claim 1, wherein prior to establishing connectivity for the host to access L1 over P1, L1 is not exposed to the host over any path between the host and DS1.

3. The computer-implemented method of claim 1, wherein prior to establishing connectivity for the host to access L1 over P2, L1 is not exposed to the host over any path between the host and DS2.

4. The computer-implemented method of claim 1, further comprising:

establishing connectivity for the host to access L1 over P2 between the host and DS2, wherein a second volume V2 on DS2 is configured as L1 and wherein V2 is exposed to the host as L1 over P2 between the host and DS2; and updating second configuration information of DS2 to include the fully populated uniform host connectivity information for the host, and wherein at a second point in time T2 subsequent to T1, P1 is established, P2 is established, and L1 is exposed over both P1 and P2 to the host.

5. The computer-implemented method of claim 4, wherein V1 and V2 are configured for bi-directional synchronous replication.

6. The computer-implemented method of claim 5, further comprising:

receiving, at DS1 from the host over P1, first writes directed to L1 are received at DS1; and in response to said receiving the first writes, performing second processing including:
applying the first writes to V1 configured as L1;
replicating the first writes to DS2; and
applying the first writes to V2 configured as L1.

7. The computer-implemented method of claim 6, further comprising:

receiving, at DS2 from the host over P2, second writes directed to L1 are received at DS2; and in response to said receiving the second writes, performing third processing including:
applying the second writes to V2 configured as L1;
replicating the second writes to DS1; and
applying the second writes to V1 configured as L1.

8. The computer-implemented method of claim 1, wherein said first processing includes:

receiving, at DS1, a first command from the host sent over P1, and wherein said reporting the first information is in response to said receiving the first command from the host over P1.

9. The computer-implemented method of claim 1, wherein P1 denotes a path between a first initiator of the host and a first target port of DS1, and wherein L1 is exposed over the first target port to the first initiator.

10. The computer-implemented method of claim 9, further comprising:

reporting second information from DS2 to the host, wherein the second information indicates that L1 is not exposed to the host over any path from DS2, and wherein P2 denotes a path between the first initiator of the host and a second target port of DS2, and wherein the second information is reported by the second target port to the host.

11. The computer-implemented method of claim 10, wherein the host detects an inconsistency between the first information and the second information regarding P2 with respect to L1, wherein the inconsistency is that the first information indicates P2 is established whereby L1 is exposed over P2 having an associated state S2, and that the second information indicates that P2 is not established whereby L1 is not exposed over P2.

12. The computer-implemented method of claim 11, wherein the host resolves the inconsistency by using the second information sent from the second target port of DS2.

13. The computer-implemented method of claim 12, wherein the second target port is authoritative regarding path state information for paths including the second target port.

14. The computer-implemented method of claim 1, wherein the fully populated uniform host connectivity information for the host indicates that the state S1 for P1 is active optimized (AO) for the host with respect to L1 thereby indicating that the host use P1 to send I/Os to L1, and wherein the fully populated uniform host connectivity information for the host indicates that the state S2 for P2 is active non-optimized (ANO) for the host with respect to L1 thereby indicating that the host not use P2 to send I/Os to L1.

15. The computer-implemented method of claim 1, wherein the host and DS1 are in the same data center thereby indicating that DS1 is locally located with respect to the host, and wherein the host and DS2 are not in the same data center thereby indicating that DS2 is remotely located with respect to the host.

16. A system comprising:
one or more processors; and
one or more memories comprising code stored thereon that, when executed, performs a method of comprising:
establishing connectivity for a host to access a logical device L1 over a first path P1 between the host and a first data storage system DS1, wherein a first volume V1 on DS1 is configured as L1, and wherein V1 is exposed to the host as L1 over P1 between the host and DS1;
updating first configuration information of DS1 to include a fully populated uniform host connectivity information for the host, wherein the fully populated uniform host connectivity information includes first path state information and second path state information, wherein the first path state information includes path state information regarding P1 between the host and DS1 over which L1 is exposed to the host, and wherein the second path state information includes path state information regarding a second path P2 between the host and a second data storage system DS2 over which L1 is exposed to the host, and wherein at a first point in time, T1 is established, P2 is not yet established, L1 is exposed over P1 to the host, and L1 is not exposed over P2 to the host; and at the first point in time T1 and prior to establishing connectivity for the host to access L1 over P2 between the host and DS2, performing first processing including:
reporting, by DS1 at the first point in time T1, first information regarding L1 to the host, wherein the first information includes a first path state S1 regarding P1 whereby S1 denotes P1 is established, and wherein the first information includes a second path state S2 regarding P2 whereby S2 denotes P2 is established, and wherein S1 and S2 are included in the fully populated uniform host connectivity information.

17. One or more computer readable media comprising code stored thereon that, when executed, performs a method comprising:
establishing connectivity for a host to access a logical device L1 over a first path P1 between the host and a first data storage system DS1, wherein a first volume V1 on DS1 is configured as L1, and wherein V1 is exposed to the host as L1 over P1 between the host and DS1;
updating first configuration information of DS1 to include a fully populated uniform host connectivity information for the host, wherein the fully populated uniform host connectivity information includes first path state information and second path state information, wherein the first path state information includes path state information regarding P1 between the host and DS1 over which L1 is exposed to the host, and wherein the second path state information includes path state information regarding a second path P2 between the host and a second data storage system DS2 over which L1 is exposed to the host, and wherein at a first point in time, T1 is established, P2 is not yet established, L1 is exposed over P1 to the host, and L1 is not exposed over P2 to the host; and
at the first point in time T1 and prior to establishing connectivity for the host to access L1 over P2 between the host and DS2, performing first processing including:
reporting, by DS1 at the first point in time T1, first information regarding L1 to the host, wherein the first information includes a first path state S1 regarding P1 whereby S1 denotes P1 is established, and wherein the first information includes a second path state S2 regarding P2 whereby S2 denotes P2 is established, and wherein S1 and S2 are included in the fully populated uniform host connectivity information.

18. The one or more computer readable media of claim 17, wherein prior to establishing connectivity for the host to access L1 over P1, L1 is not exposed to the host over any path between the host and DS1.

19. The one or more computer readable media of claim 17, wherein prior to establishing connectivity for the host to access L1 over P2, L1 is not exposed to the host over any path between the host and DS2.

20. The one or more computer readable media of claim 17, wherein the method further comprises:
establishing connectivity for the host to access L1 over P2 between the host and DS2, wherein a second volume V2 on DS2 is configured as L1 and wherein V2 is exposed to the host as L1 over P2 between the host and DS2; and
updating second configuration information of DS2 to include the fully populated uniform host connectivity information for the host, and wherein at a second point in time T2 subsequent to T1, P1 is established, P2 is established, and L1 is exposed over both P1 and P2 to the host.

* * * * *